(12) United States Patent
Baumann et al.

(10) Patent No.: US 7,833,424 B1
(45) Date of Patent: Nov. 16, 2010

(54) BACKWASH ASSEMBLY AND METHOD HAVING A ROTATING BACKWASH ARM FOR CLEANING CLOTH FILTER MEDIA

(75) Inventors: Peter G. Baumann, Roscoe, IL (US); David Smith, Beloit, WI (US)

(73) Assignee: Aqua-Aerobic Systems, Inc., Rockford, IL (US)

( * ) Notice: Subject to any disclaimer, the term of this patent is extended or adjusted under 35 U.S.C. 154(b) by 0 days.

(21) Appl. No.: 12/804,776

(22) Filed: Jul. 29, 2010

Related U.S. Application Data

(60) Division of application No. 11/894,359, filed on Aug. 24, 2007, which is a continuation-in-part of application No. 11/005,561, filed on Dec. 6, 2004, which is a division of application No. 10/329,630, filed on Dec. 26, 2002, now Pat. No. 6,858,140.

(51) Int. Cl.
  *B01D 29/68* (2006.01)
(52) U.S. Cl. .................... 210/791; 210/806
(58) Field of Classification Search .......... 210/791, 210/793, 798, 806
  See application file for complete search history.

(56) References Cited

U.S. PATENT DOCUMENTS

| | | |
|---|---|---|
| 1,359,162 A | 11/1920 | Genter |
| 1,483,111 A | 2/1924 | Price |
| 2,028,466 A | 1/1936 | Moran |
| 2,302,449 A | 11/1942 | Laughlin |
| 2,342,035 A | 2/1944 | Clark |
| 2,351,332 A | 6/1944 | Goodloe |
| 2,940,595 A | 6/1960 | Crane |
| 3,339,742 A | 9/1967 | Kracklauer |
| 3,397,141 A | 8/1968 | Shiro |
| 3,481,479 A | 12/1969 | Terhune |
| 3,559,809 A | 2/1971 | Barmore |
| 3,623,614 A | 11/1971 | Schmidt, Jr. |
| 3,635,343 A | 1/1972 | Holland |
| 3,731,814 A | 5/1973 | Walters |
| 3,959,148 A | 5/1976 | Krynski |
| 4,090,965 A | 5/1978 | Fuchs |
| 4,107,026 A | 8/1978 | Freeman |
| 4,116,838 A | 9/1978 | Lazzarotto |
| 4,152,265 A | 5/1979 | Meyers |
| 4,519,903 A | 5/1985 | Johnson |
| 4,540,487 A | 9/1985 | Johnson |

(Continued)

FOREIGN PATENT DOCUMENTS

DE   3902829 A   8/1990

(Continued)

OTHER PUBLICATIONS

Photos of system equivalent to that shown schematically in Figs 29, 30 & 31 of U.S. Patent 6,858,140.

*Primary Examiner*—Terry K Cecil
(74) *Attorney, Agent, or Firm*—Niro, Haller & Niro

(57) ABSTRACT

The present invention relates to a method for cleaning cloth filter media supported on a plurality of opposingly-spaced filter plate frames. A backwash assembly (23) moves linearly and includes at least one cylindrical backwash arm (200) that rotates to consecutively clean the media of the spaced filter plate frames.

4 Claims, 36 Drawing Sheets

U.S. PATENT DOCUMENTS

| | | |
|---|---|---|
| 4,579,656 A | 4/1986 | Johnson |
| 4,639,315 A | 1/1987 | Fuchs |
| 4,790,935 A | 12/1988 | Johnson |
| 4,859,332 A | 8/1989 | Johnson |
| 4,898,671 A | 2/1990 | Fux |
| 4,919,805 A | 4/1990 | Johnson |
| 5,035,799 A | 7/1991 | Rosberg |
| 5,057,217 A | 10/1991 | Lutz |
| 5,268,095 A | 12/1993 | Barzuza |
| 5,362,384 A | 11/1994 | Whetsel |
| 5,374,360 A | 12/1994 | Weis |
| 5,401,405 A | 3/1995 | McDougald |
| 5,567,327 A | 10/1996 | De Haan et al. |
| 5,575,910 A | 11/1996 | Karbachsch |
| 5,876,612 A | 3/1999 | Astrom |
| 6,090,298 A | 7/2000 | Weis |
| 6,103,132 A | 8/2000 | Seyfried |
| 6,294,098 B1 | 9/2001 | Bergmann |
| 6,679,994 B1 | 1/2004 | Turco |
| 6,858,140 B2 | 2/2005 | Baumann |
| 7,537,689 B2 | 5/2009 | Ricketts |
| 2004/0245190 A1 | 12/2004 | Baumann |
| 2005/0115911 A1 | 6/2005 | Smith |
| 2005/0161393 A1 | 7/2005 | Baumann |

FOREIGN PATENT DOCUMENTS

| | | |
|---|---|---|
| JP | 55-44359 A | 3/1980 |

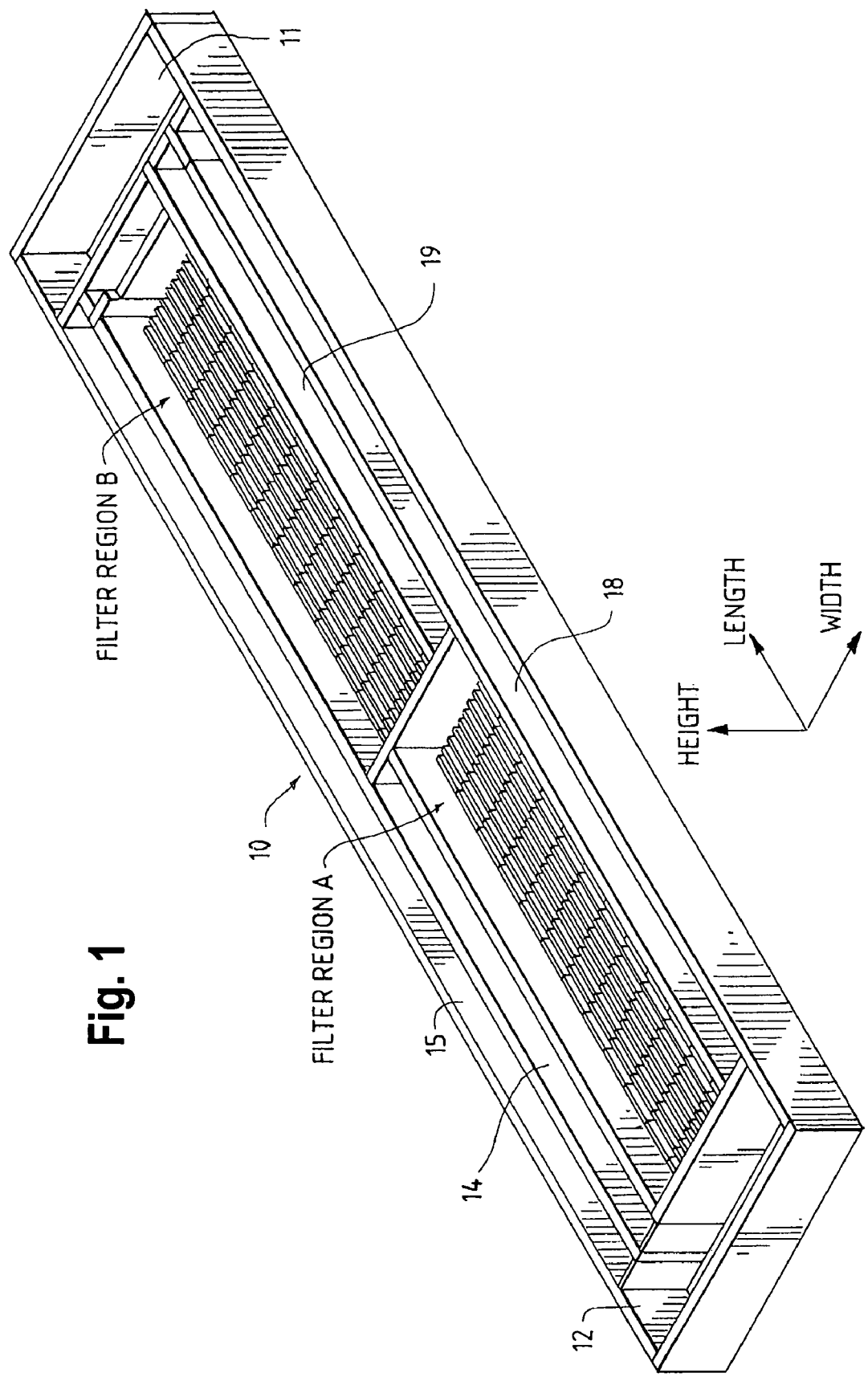

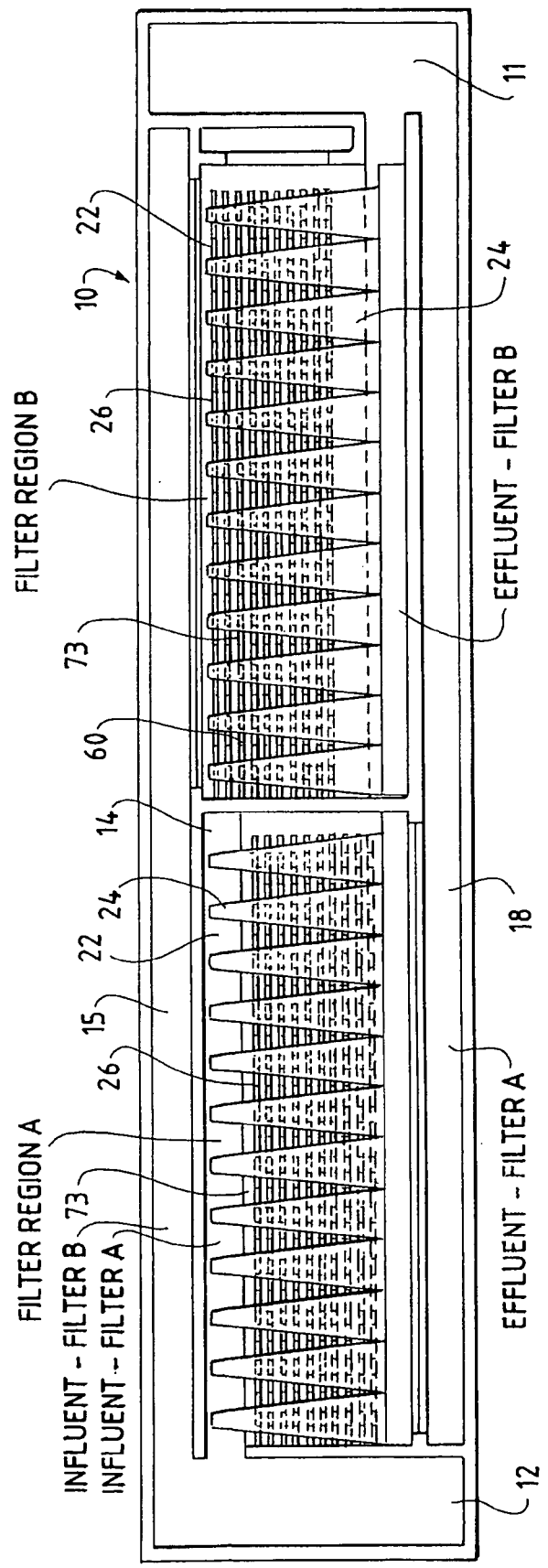

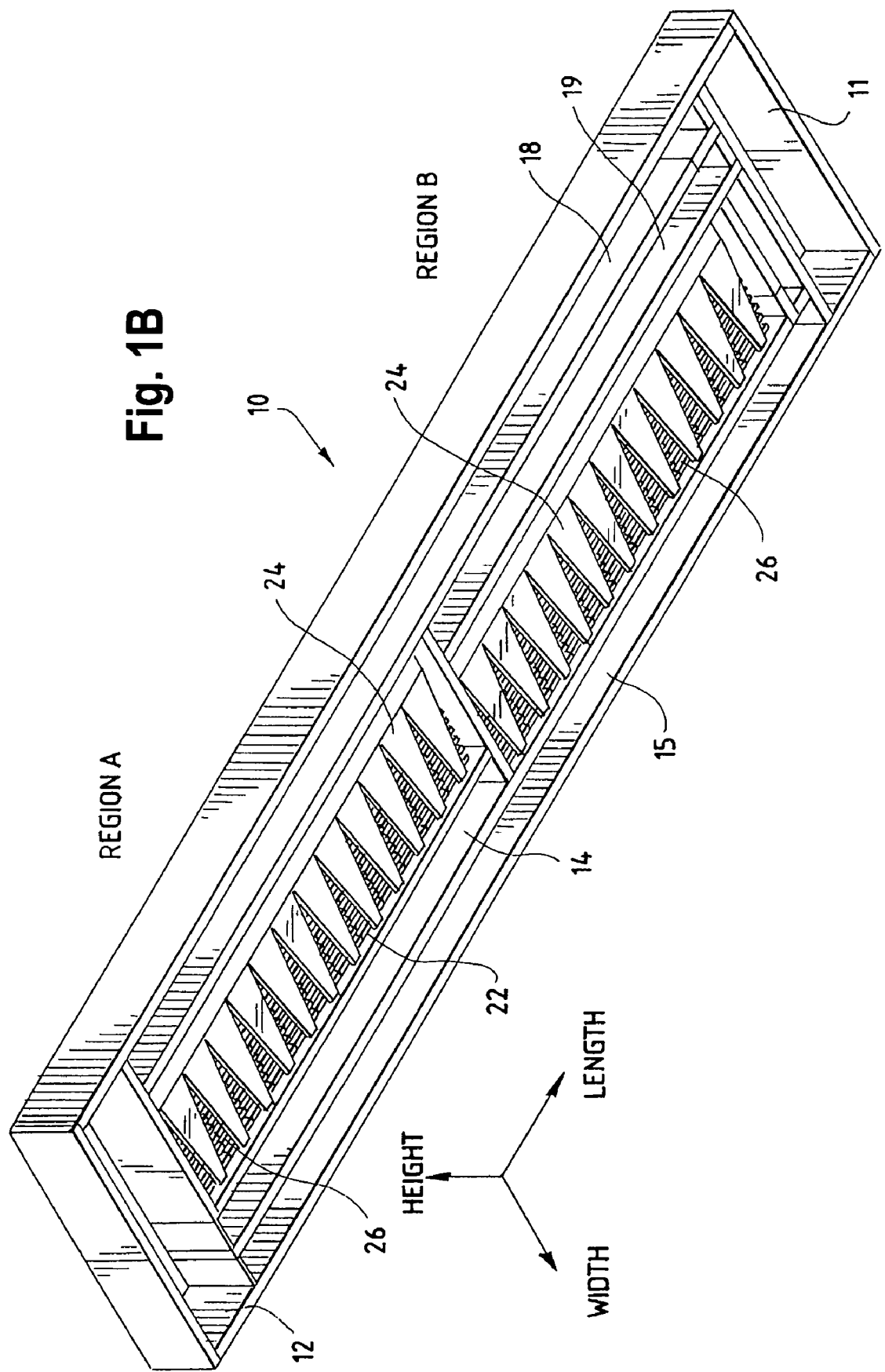

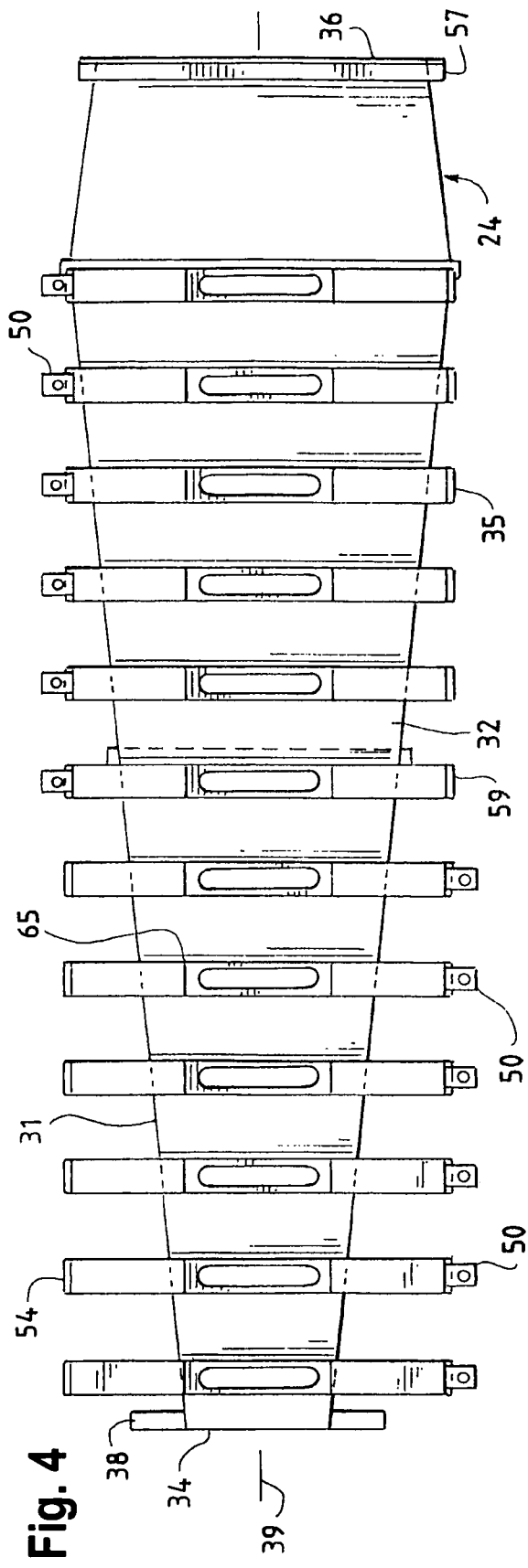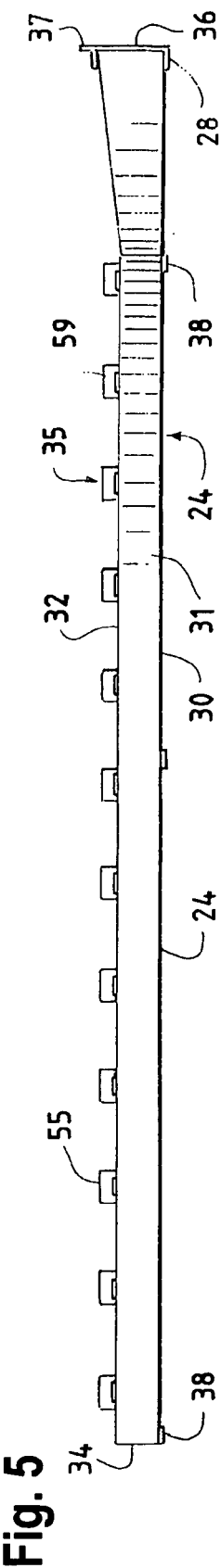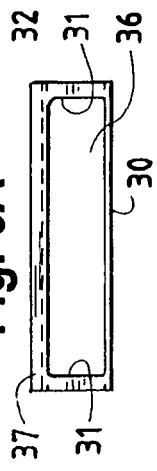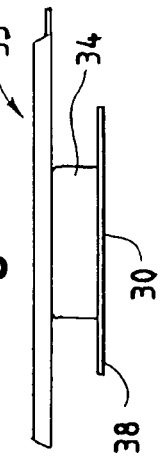

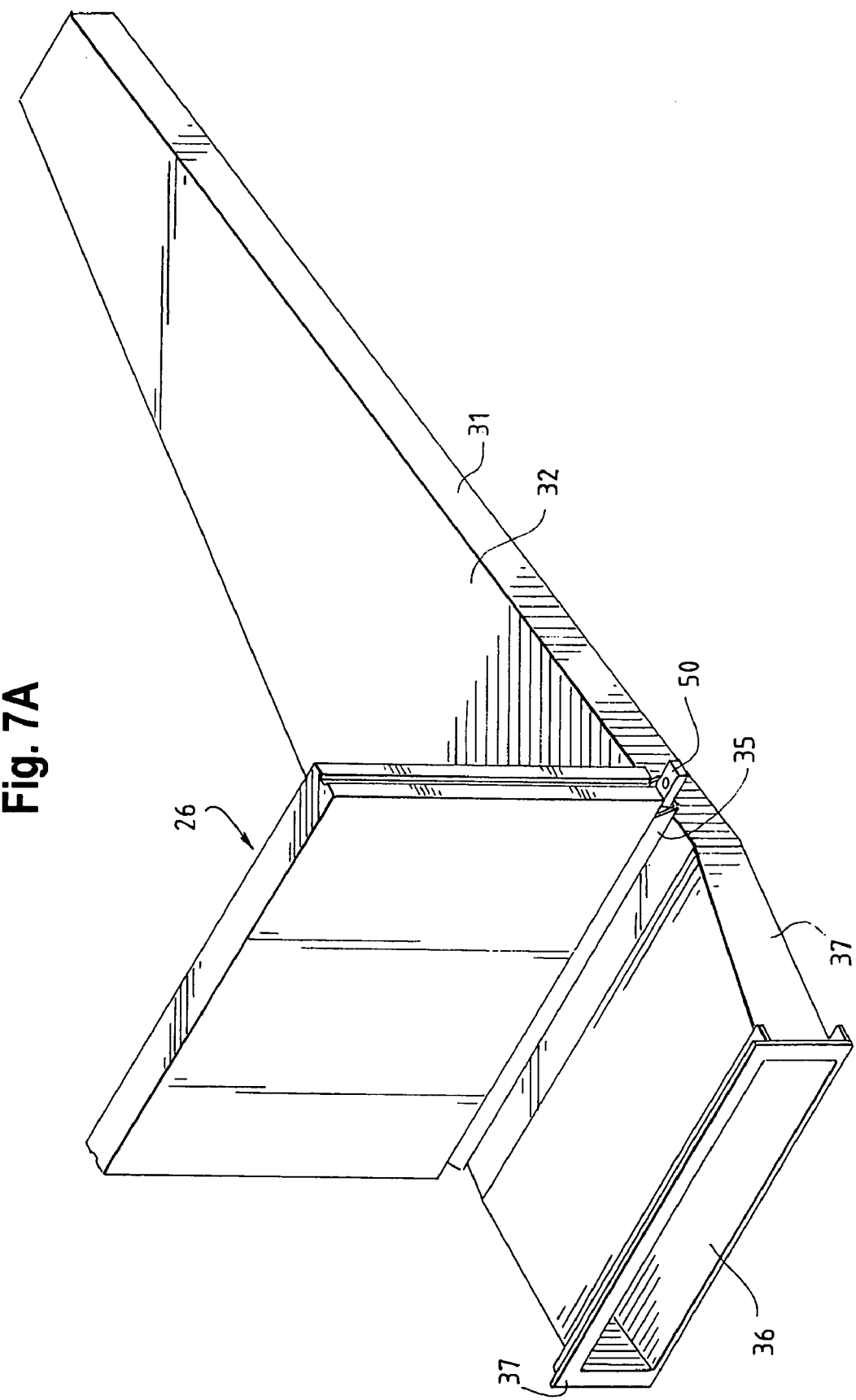

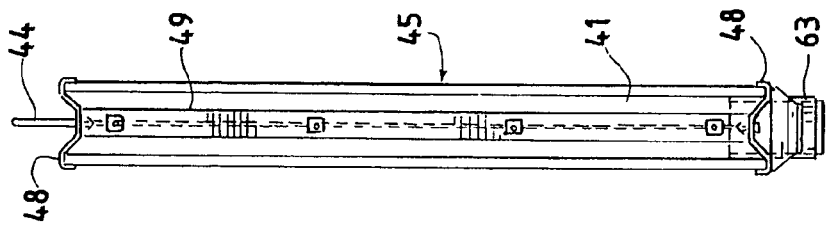
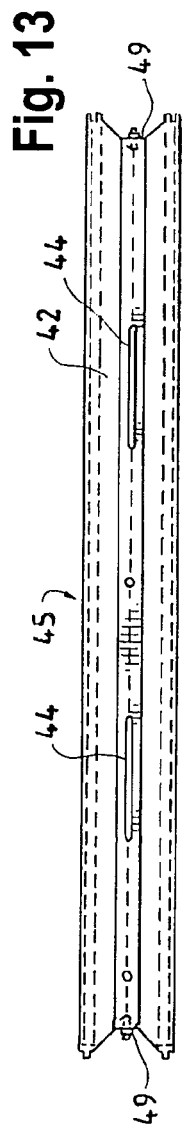
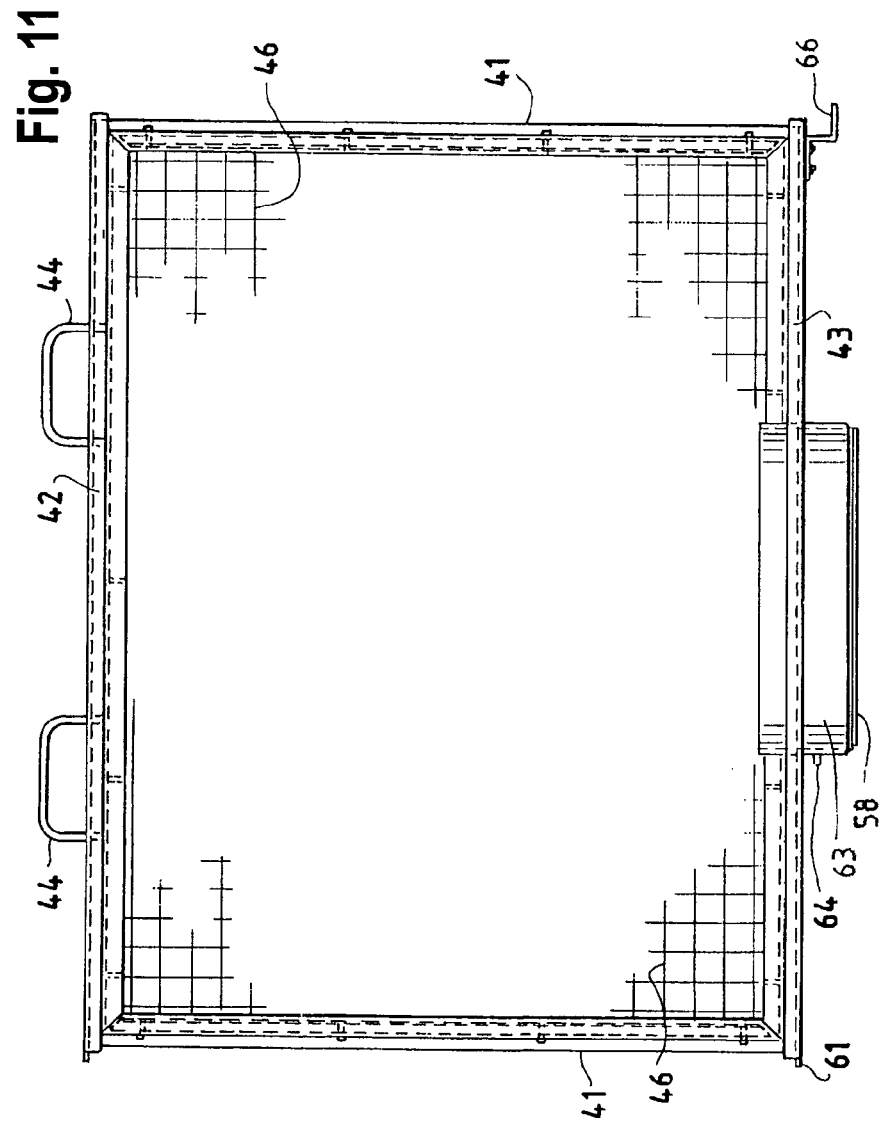

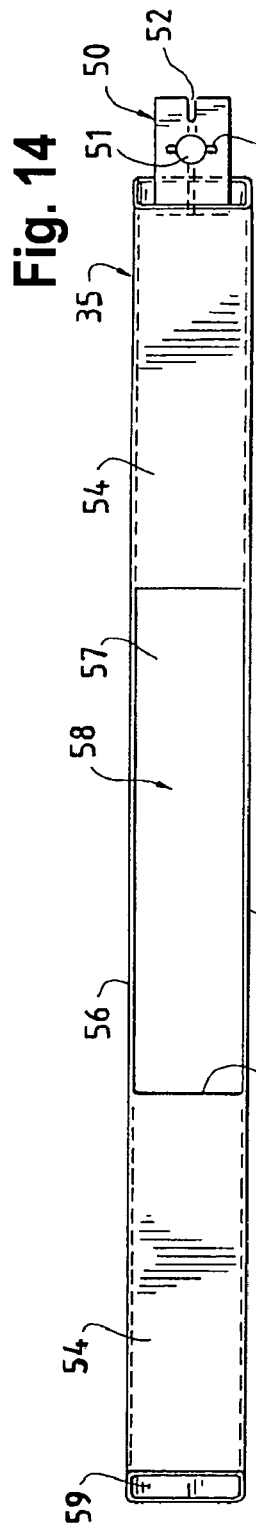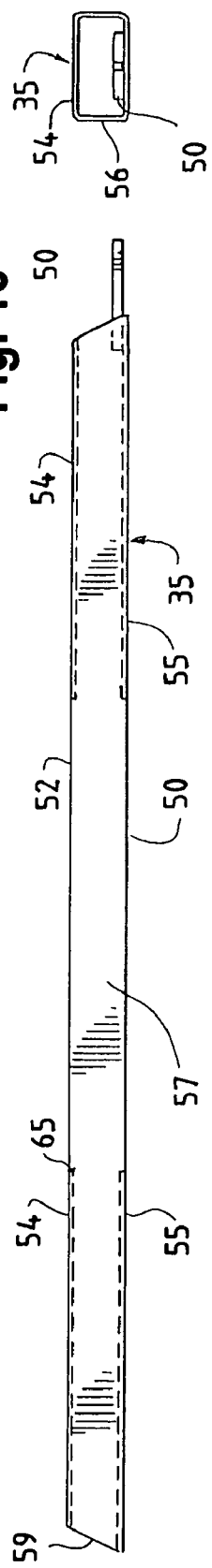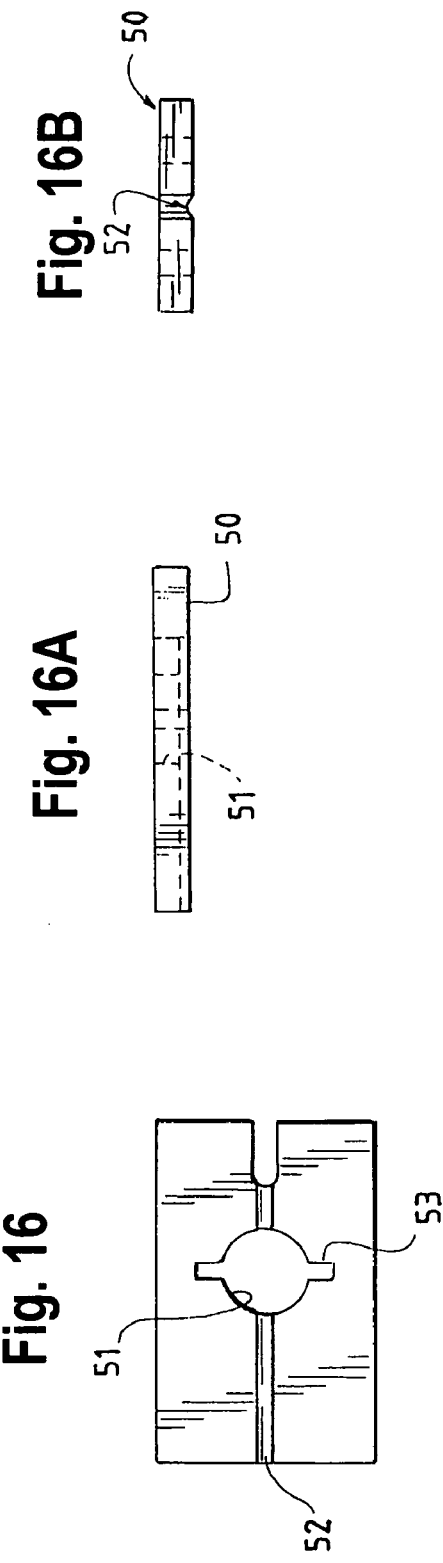

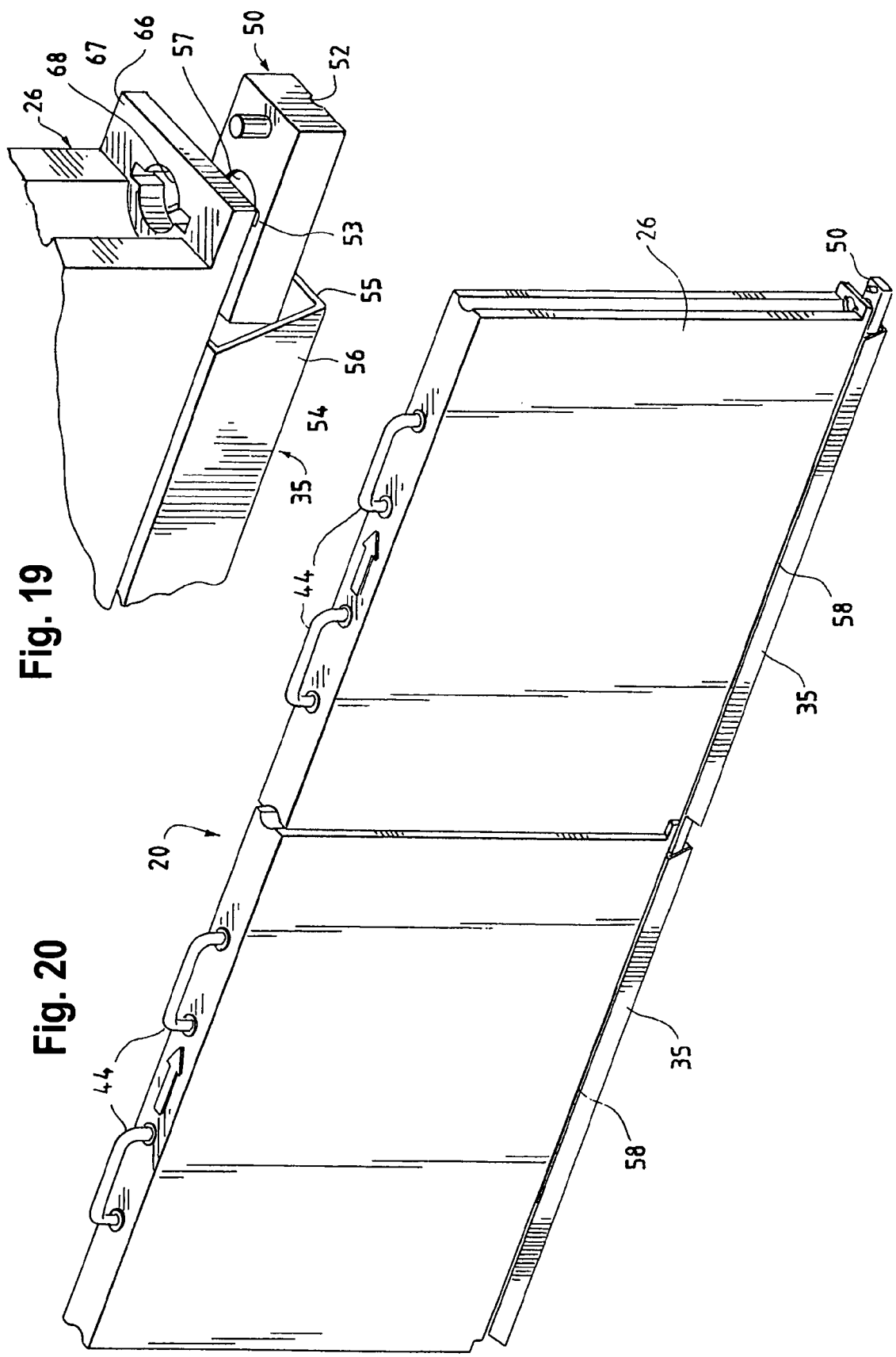

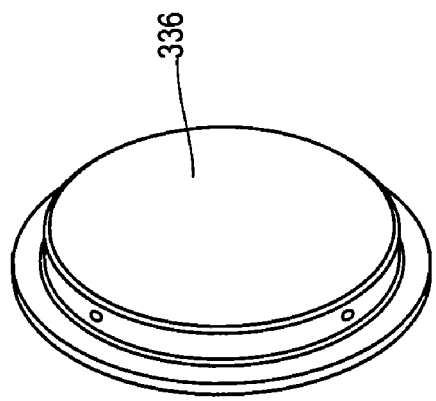
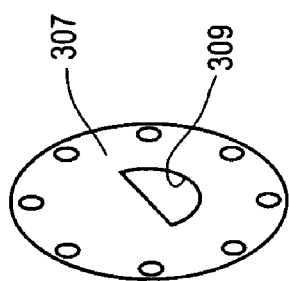
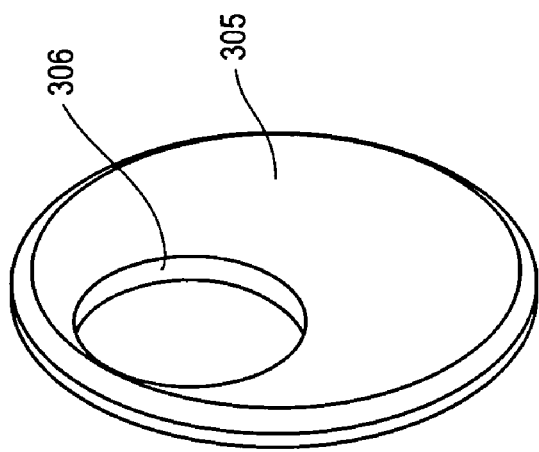

BACKWASH ASSEMBLY AND METHOD HAVING A ROTATING BACKWASH ARM FOR CLEANING CLOTH FILTER MEDIA

RELATED APPLICATIONS

This patent application is a divisional of prior application U.S. Ser. No. 11/894,359, filed on Aug. 24, 2007, now pending; which is a continuation-in-part of U.S. Ser. No. 11/005,561, filed on Dec. 6, 2004, now pending; which is a divisional of Ser. No. 10/329,630, filed on Dec. 6, 2002, which issued as U.S. Pat. No. 6,858,140 on Feb. 22, 2005; all of which are incorporated herein.

FIELD OF THE INVENTION

The present invention relates generally to water and wastewater treatment processes. More particularly, the present invention relates to stationary cloth media filtration systems and devices, as well as processes and devices for uniform flow distribution and backwashing.

BACKGROUND OF THE INVENTION

There are a variety of established water and wastewater treatment systems. One type that has been in use for decades, in one form or another, is granular media gravity filtration. Granular media gravity filters, such as conventional deep bed sand filters, are used to strain out particles from a wastewater stream. Typically, wastewater is introduced into a sand filtration region from an influent chamber through inlet ports. The influent flows by gravity through the granular media filter, such as sand contained by a porous plate, to an effluent chamber. The granular media filter bed, which is typically divided into a series of adjacent cells, is then periodically cleaned using a variety of backwash procedures. See, for example, U.S. Pat. No. 4,152,265.

Another well known type of water and wastewater filtration is rotating cloth media filtration, often referred to as disk or drum filtration. In general, disk or drum filtration systems include a tank having an inlet and outlet and a rotatable filter frame positioned between the inlet and outlet. Cloth filter media is stretched over large drums or disk-type frame sections of the rotatable filter frame. During filtering, influent flows into the tank and passes through the cloth filter media, depositing the suspended solids on the filter media. The filtered effluent is then discharged from the tank outlet. See, for example, U.S. Pat. Nos. 4,090,965 and 4,639,315. The cloth filter media is periodically cleaned by a variety of procedures, including backwashing and/or high pressure sprays. See, for example, U.S. Pat. Nos. 5,374,360, 5,876,612 and 6,090,298. And, an improved self-aligning backwash system, among other things, for cleaning stationary cloth media is also described in U.S. Publication No. US2005/0161393A1, which is also incorporated herein.

In the early 1970's, a stationary cloth media filtration system was attempted in Europe. As shown schematically in FIG. 29, it is believed that this system included a filtration basin with a series of rectangular effluent chambers, each effluent chamber sandwiched between a pair of rectangular influent chambers. The vertical walls between influent chambers and the effluent chamber had a series of openings or windows across which cloth media screens were attached (FIG. 30). In operation, the wastewater to be treated was introduced into the influent chambers through subsurface gates. The influent was filtered by passing the flow through the screened windows of the filtration walls into the effluent chamber. From there, the filtered effluent flowed through subsurface gates to be discharged. The screens of this system were periodically cleaned by backwashing, which was accomplished by pulling a backwash header vertically up against the cloth filter media, using a submerged chain and sprocket arrangement.

This attempt at stationary cloth media filtration suffered from a number of problems. For example, if one of the filter screens failed, that whole section of the filtration system would have to be shut down, i.e., 2 influent chambers and associated effluent chamber. In addition, because of their design, the seals around the filtration screens were prone to leaks or failure, resulting in poor quality effluent. Similarly, since most of the moving parts, such as the chain and sprocket system needed for backwashing, were submerged, the chambers had to be dewatered before maintenance could be conducted. In short, this attempt at a cloth filtration system was very complicated and inefficient. It is believed that the system was a failure and was abandoned. As a result, the industry moved in the direction of rotating cloth media filtration methods, as generally described above.

Cloth media filtration systems require that the cloth filter media be subject to periodic cleaning, such as by backwashing and/or high pressure spray. Typical backwashing, in a system such as that shown in FIGS. 29 and 30, includes a suction header and backwash shoe assembly which is pressed directly against and pulled along the cloth filter media surface. In operation, a vacuum is applied to the suction header, pulling fluid through the cloth filter media and the backwash shoe in a direction opposite the flow direction during filtering (see FIG. 31). This reverse flow removes much of the accumulated solids caught in and blocking the cloth filter media. Typically, the suction header and shoe press directly against the cloth filter media (including the area where the cloth media is pulled against the frame assembly) in the conventional backwash arrangement (even when backwashing is not being conducted), which may put the cloth filter media under a preload. This may result in increased wear and premature break-through of the cloth filter media.

As indicated, regardless of whether cloth media filtration is stationary or rotating, it is necessary to periodically backwash the cloth filter media. In stationary cloth systems, backwashing is typically conducted in conjunction with traversing or traveling bridge type systems. In larger systems, a large number of backwash arms, sequencing valves and control wires may be necessary to properly effectuate the backwashing operation. In addition, in known traversing backwash systems for stationary cloth media filtration, a number of sequencing valves are required to coordinate the backwashing operation to the desired arm and/or shoe. More complicated control wiring is also required.

Conventional rotating cloth media filtration also has some inherent limitations. For example, the filtration area is limited by the size of the disks/drums and/or tanks. Larger disks/drums require deeper and larger tanks, increasing their construction costs. The retrofit or construction of smaller tanks requires smaller disks, which reduces the filtration surface area.

Again, regardless of the type of filtration media used, uneven flow distribution over the volume of the filtration basin or region is a potential problem. For example, uneven or non-uniform flow distribution within the filtration basin or region often results in sludge settling, particularly in areas of low turbulence. This often results in the need for additional sludge removal equipment or increased system down time. In addition, non-uniform flow velocity across the filter may also result in increased sludge settling.

Thus, while the conventional deep bed sand and rotating disk filtration systems generally described above have been widely and successfully used in a variety of applications, each of these systems suffer from drawbacks inherent in or related to their size, design and/or application.

SUMMARY OF THE INVENTION

The present inventions preserve the advantages of known water and wastewater treatment filtration systems and devices and provide new features, advantages and benefits over these systems. In addition, the present inventions preserve the advantages of known systems and devices that may be used and/or are associated with these systems and provide new features, advantages and benefits.

For example, the present inventions provide higher quality effluent (even at high solids and hydraulic loading rates), lower backwash rates and higher capacity for a given basin footprint, when compared to conventional sand filters. They also eliminate sand or other granular media, making backwashing faster and more efficient. When compared to rotating disk-type or drum-type cloth media filtration systems, the present inventions provide, among other things, higher capacity while maintaining a comparably high quality effluent, continuous filtration during the backwash cycle and the elimination of the necessity for rotary disks and drums and their associated hardware. The present invention also provides more uniform flow distribution in the basin and over the filtration media, regardless of the type of filtration media used. The present inventions also improve the backwashing operation and reduce wear and break-through of cloth filter media for a variety of types of cloth media filtration.

In addition, the present inventions provide for effective stationary cloth media filtration, using unique filter plates that overcome the disadvantages of the previously attempted stationary cloth media filtration. Uniform flow distribution and decreased sludge settling, as well as improved backwashing procedures, are also provided.

The present inventions also provide for an improved backwash assembly having rotating backwash arms which are capable of cleaning more than one row of cloth media filtration surfaces. This results in a reduction of the number of backwash arms and sequencing valves required to conduct the backwash operation.

In a preferred embodiment of the present invention, a stationary cloth media filtration system for treating an influent flow of water or wastewater in a filtration basin is provided having an influent channel that receives influent flow; at least one influent plenum having metering slots to distribute the influent flow across the bottom of the filtration basin; at least one effluent plenum sealed from the unfiltered influent; and, at least two adjacent filter plates supporting a cloth filter media to filter the influent in a filtration region of the filtration basin, said at least two adjacent filter plates in fluid communication with said at least one effluent plenum through which the filtered effluent is discharged from the system. In addition, a preferred embodiment also provides a backwash assembly to periodically clean said cloth filter media on said at least two adjacent filter plates, said backwash assembly including at least one rotating backwash arm. The rotating backwash arm may also include a fixed attachment assembly, a sealed rotation assembly and a shoe attachment assembly. A motor may also be provided on a traveling bridge structure to cause the selective rotation of the rotating backwash arms.

In a preferred embodiment of the present invention, a stationary cloth media filtration system for treating a flow of water or wastewater in a filtration basin is provided which includes at least one influent plenum having metering slots to distribute the influent flow across the bottom of the filter basin; at least one effluent plenum sealed from the influent plenum to discharge filtered flow from the system; a filtration region having a series of filter plates which are in fluid communication with the effluent plenums; and, a backwash assembly to periodically clean the filter plates. Preferred embodiments may also include generally trapezoidally shaped, influent and effluent plenums that are complementary to one another and located along the bottom of the filter basin. Moreover, filter plates may be fastened directly to the plenums. Preferred embodiments may further include a backwash system having rotatable backwash arm assemblies.

Also in a preferred embodiment of the present invention, a method of treating water or wastewater in a filtration basin using filter plates is provided. The method includes providing an influent flow of water or wastewater to be treated to an influent channel and uniformly distributing the influent flow along the length of the bottom of the filter basin; distributing the influent flow uniformly across the width of the bottom of the filter basin; filtering the influent flow with the filter plates; discharging the filtered effluent with a relatively constant flow velocity and reduced head loss; and, periodically cleaning the filter plates with suction. Preferred embodiments may also include a backwash system having rotatable backwash arm assemblies.

The present inventions also provide a system for providing uniform flow distribution for filtering a water or wastewater influent flow in a filtration region with at least one trapezoidally shaped influent plenum with orifices to distribute the influent flow into the filtration region, and at least one trapezoidally shaped effluent plenum having orifices to receive the filtered effluent flow.

Another preferred embodiment of the present invention provides an improved backwash system for backwashing cloth filter media attached to a frame. This system includes a backwash header, a backwash shoe and a means to create a gap between the backwash shoe and the cloth filter media.

Still another preferred embodiment of the present invention provides an improved traversing backwash system that includes rotating backwash arm assemblies capable of conducting the cleaning operation on multiple cloth filter media surfaces. Such embodiments may include a fixed attachment assembly, a sealed rotation assembly and a shoe attachment assembly. A means for simultaneous rotation of a number of rotatable arms may also be provided. And, a flow shut off valve or valve assembly may be provided for the outside rotating backwash arms to prohibit the application of suction to those arms when backwash is not desired.

Yet another embodiment of the present invention provides an improved backwash system for backwashing cloth filter media attached to a frame, including a suction header, a rotating backwash arm in fluid communication with said suction header, a backwash shoe in fluid communication with said rotating backwash arm and a rotating means to cause the selective rotation of said rotating backwash arm. A preferred rotating backwash arm assembly may include a fixed attachment assembly, a sealed rotation assembly engaged with said fixed attachment assembly and a shoe attachment assembly mounted to said sealed rotation assembly. Flow restriction means for selectively stopping backwash to a particular rotating backwash arm may also be provided.

The present invention also provides at least one rotating backwash arm assembly for backwashing cloth filter media, said rotating backwash arm attached to a traveling bridge assembly, including a sealed rotation assembly and a shoe attachment assembly including a backwash shoe. In addition, the present invention may also provide a system for backwashing at least one filter plate and having at least two rotating backwash arm assemblies for periodically cleaning the cloth filter media on the at least one filter plate.

The present inventions still further provide a stationary cloth media filtration system for treating an influent flow of water or wastewater in a filtration basin. An influent channel which receives the influent flow and distributes the influent flow into the filtration basin is also provided with at least one outlet sealed from the unfiltered influent; at least two adjacent filter plates supporting a cloth filter media to filter the influent in a filtration region of the filtration basin, the at least two adjacent filter plates in fluid communication with the at least one outlet through which the filtered effluent is discharged from the system; and, a backwash assembly to periodically clean said cloth filter media on the at least two adjacent filter plates, the backwash assembly including at least one rotating backwash arm. A traveling bridge that transverses the length of the filtration basin and/or which serves as a suction manifold for the backwash assembly may also be provided.

The present inventions further provide for a method for backwashing cloth filter media attached to a frame including the steps of introducing untreated influent into a treatment basin; filtering the influent through cloth filter media; periodically cleaning at least one surface of the cloth filter media by backwashing through a rotating backwash arm assembly in fluid communication with a suction header; and, selectively rotating the backwash arm assembly to enable the backwashing of an adjacent cloth filter media surface.

Accordingly, it is an object of the present invention to provide processes and devices for stationary cloth media filtration and/or the backwashing thereof;

Another object of the present invention is to provide processes and devices for stationary cloth media filtration that may be retrofit into existing filtration basins or designed for new installations;

An additional object of the present invention is to provide processes and devices for stationary cloth media filtration that provide the capability of continuous filtration during backwashing;

A further object of the present invention is to provide processes and devices for stationary cloth media filtration with high quality effluent and the maintenance of high quality effluent at high solids and high hydraulic loading rates;

Still another object of the present invention is to provide processes and devices for stationary cloth media water and wastewater filtration that eliminate the need for traditional granular media;

Still an additional object of the present invention is to provide processes and devices for stationary cloth media filtration that may provide cost advantages over traditional granular media filtration, including but not limited to, reduced site footprint requirements, resulting in less land use, decreased concrete costs, as well as reduced enclosure costs in colder climates, and/or reduced operational, maintenance and manufacturing costs, such as the ability to change components above the water, easy replacement of cloth media filter membranes and the like;

Still a further object of the present invention is to provide processes and devices for the uniform fluid flow distribution into and/or over the volume of a filtration region or filtration basin;

Still an additional object of the present invention is to provide processes and devices for the maintenance of consistent flow velocity in a filtration region or filtration basin;

Yet an additional object of the present invention is the uniform distribution of flow in a filtration basin or filtration region;

Yet another object of the present invention is to provide processes and devices for distributing and/or collecting flow in a filtration region or basin having increased turbulence at the lower portion of the filtration region or filtration basin and/or reduced amounts of sludge settlement or other solids and/or a reduced need for dedicated sludge removal equipment;

Yet a further object of the present invention is to provide processes and devices that effectuate uniform flow distribution over the filtration region or basin using a combination of influent and effluent channeling to control flow and distribution;

Still yet another object of the present invention is to provide processes and devices for improved backwashing of cloth filter media and/or the integration of rotating backwash arms to the suction header to reduce the number of or eliminate sequential valves;

Still yet an additional object of the present invention is to provide processes and devices for cloth filtration media backwashing without a preload on the cloth filter media;

Still yet a further object of the present invention is to provide processes and devices for cloth filter media backwashing, including a stop to position the suction header and shoe away from the cloth filter media;

Still yet a further object of the present invention is to provide an improved backwash assembly including a rotating backwash arm that is capable of cleaning more than one row of cloth filter media and/or which reduces the number of backwash arms or shoes required, eliminates or reduces sequencing valves and/or reduces control wiring;

An additional object of the present inventions is to provide a traveling bridge assembly that serves as a common suction header/manifold for a plurality of backwash arms;

Still yet a further object of the present invention is to provide processes and devices for backwashing cloth filter media that extend cloth filter media life by decreased wear rate; and, Still yet a further object of the present invention is to provide water and wastewater filtration systems and devices that include one or more of the above stated objects, features or advantages, alone or in combination.

Definition of the Terms

The following terms which may be used in the various claims of this patent are intended to have their broadest meaning consistent with the requirements of law:

Cloth filter media: Any permeable cloth-like material, including but not limited to natural or synthetic fiber or membrane compositions.

Filtration basin: The overall area devoted to the filtration process, which may typically be divided into various filtration regions, and which may have associated chambers, channels and the like.

Filtration region: The area or areas in a filtration basin where water and wastewater filtering is conducted, for example, by using stationary cloth filter media in accordance with the present inventions.

Filter plate(s): The cloth media filter frame assembly, including at least the side, top and bottom frame members, and associated cloth filter media. It may optionally include other components as well and the term may often be used interchangeably with filter frame assembly herein.

Traveling bridge assembly: The structural and mechanical assembly typically located above the filtration basin that carries the components necessary to conduct the backwash and other operations, including the common suction header and/or manifold, and which is able to traverse the effective length or portion of the filtration region or filtration basin.

Where alternative meanings are possible, in either the specification or claims, the broadest meaning is intended. All words used in the claims are intended to be used in the normal, customary usage of grammar and the English language.

BRIEF DESCRIPTION OF THE DRAWINGS

The above described objects, features and advantages, as well as other features and advantages of the present inventions will become apparent by reference to the specification and drawings; wherein like reference numbers are used for like elements among the several views, and in which:

FIG. 1 is a side perspective view of a typical configuration of a filtration basin of the present invention having an exemplary two filtration regions;

FIG. 1A is a top plan view of the typical arrangement of the filtration basin of FIG. 1 of the present invention;

FIG. 1B is a bottom perspective view looking from below the typical configuration of the present invention of FIG. 1;

FIG. 4 is a top plan view of a preferred embodiment of an effluent plenum and associated filter frame support mounts of the present invention;

FIG. 5 is a side elevational view of the preferred effluent plenum and filter frame support mounts of FIG. 4;

FIG. 6 is an end section view of the effluent plenum and associated filter frame support mounts of FIGS. 4 and 5, showing the closed end of a preferred effluent plenum;

FIG. 6A is an end plan view of the effluent plenum of FIGS. 4 and 5, showing the influent or open end of a preferred effluent plenum;

FIG. 7A is a perspective view of a preferred and an associated filter frame support mount, including a schematic view of a filter plate engaged with the filter frame support mount;

FIG. 11 is a front plan view of a typical filter frame assembly and associated hardware of the present invention;

FIG. 12 is a side plan view of a typical filter frame assembly and associated hardware of FIG. 11;

FIG. 13 is a top plan view of the filter frame assembly and associated hardware of FIG. 11;

FIG. 14 is a top view of a filter frame support mount and a filter frame pin retaining plate of the present invention;

FIG. 15 is a side view of the filter frame support mount of FIG. 14;

FIG. 15A is an end view of the filter frame support mount and filter frame retaining plate of FIG. 15;

FIG. 16 is a top view of a preferred pin retaining plate of FIG. 14;

FIG. 16A is a side view of a preferred pin retaining plate of FIG. 16;

FIG. 16B is an end side view of a preferred pin retaining plate of FIG. 16;

FIG. 19 is a perspective view of the orientation of the pin retaining plate of the filter frame support arm and a pin retaining bracket on the filter frame assembly;

FIG. 20 is a perspective view of two adjacent filter frame assemblies showing their alignment with two adjacent and corresponding filter frame support mounts;

FIG. 46 is a perspective view of a preferred valve plate of the present invention;

FIG. 47 is a perspective view of a preferred rotating valve plate of the present invention; and, FIG. 48 is a perspective view of a preferred end cap of the present invention.

DETAILED DESCRIPTION OF PREFERRED EMBODIMENTS

Set forth below is a description of what is currently believed to be the preferred embodiments or best representative examples of the inventions claimed. Future and present alternatives and modifications to the preferred embodiments are contemplated. Any alternatives or modifications which make insubstantial changes in function, purpose, structure, use or result are intended to be covered by the claims of this patent.

The general layout of a typical configuration of one embodiment of the present invention may be seen by reference to FIGS. 1 and 1A. The present invention may be designed to fit into the footprint of an existing filtration basin to replace, for example, a granular media gravity filtration system. It may also be designed for a completely new facility, or installed in a tank arrangement similar to conventional disk filtration. Moreover, many aspects of the present invention may be applicable to other water and wastewater treatment methods.

Figure 32:
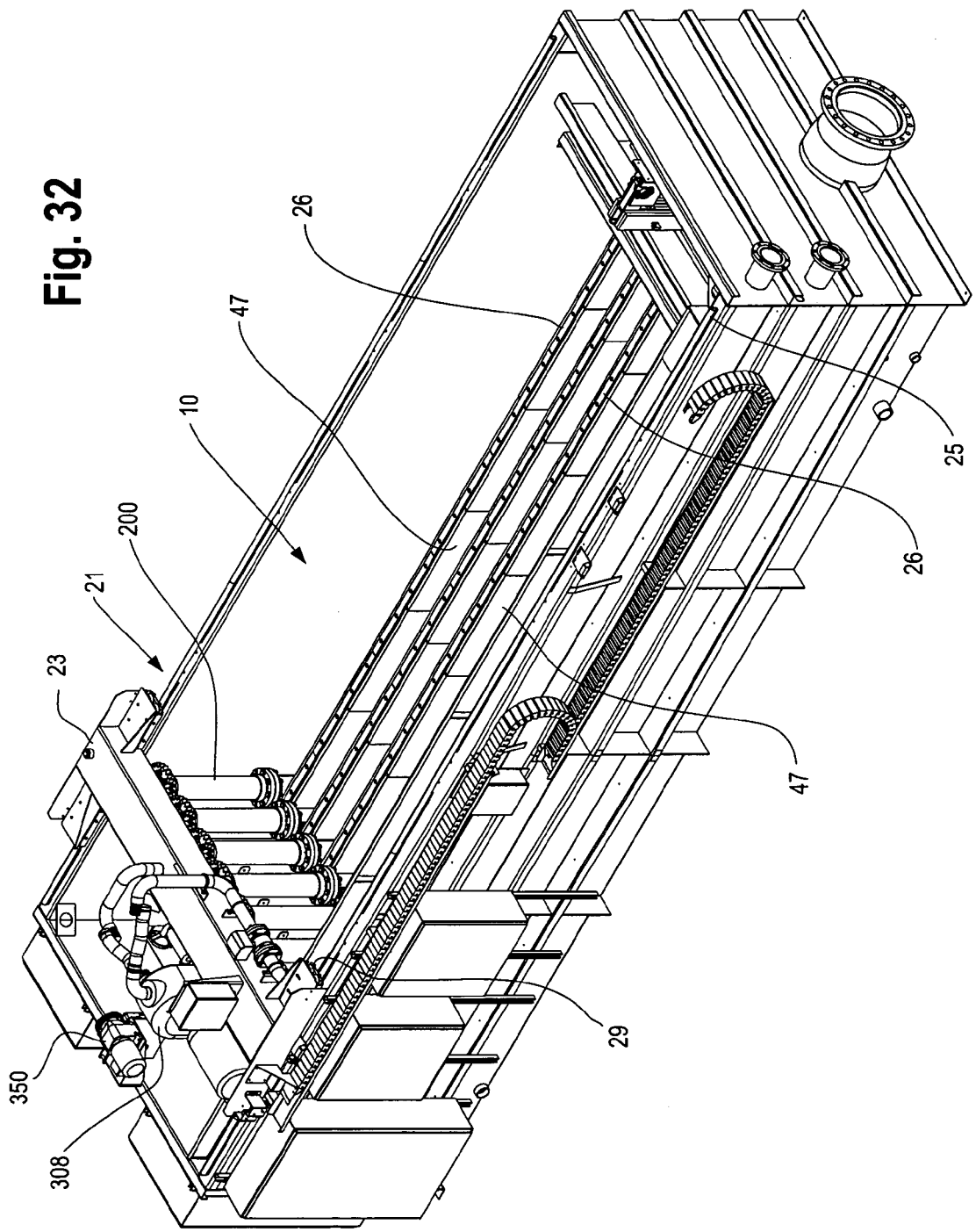
FIG. 32 is a plan perspective view of a backwash system having a preferred rotating backwash arm shown in a typical stationary cloth media filtration system.

The present invention includes a filtration basin 10, divided into a variety of channels, chambers, regions and the like, the walls creating each of which are typically constructed of concrete or other suitable material, such as steel or stainless steel, particularly in a tank setting (see e.g., FIG. 32). In the example shown in FIGS. 1 and 1A, filtration basin 10 is divided into two cloth media filtration regions A and B. Cloth media filtration regions A and B are, in all aspects pertinent to the present inventions, identical in structure and operation. It will be understood by those of ordinary skill in the art that one (basin), two or any number of filtration regions may be provided depending upon the requirements of the particular application. For example, as shown in FIG. 32, basin 10 defines one filtration region. Moreover, to create additional cloth media filter regions, a diversion of the influent into each of the desired regions and collection of the treated effluent out of each of the filter regions will be required.

Figure 2:
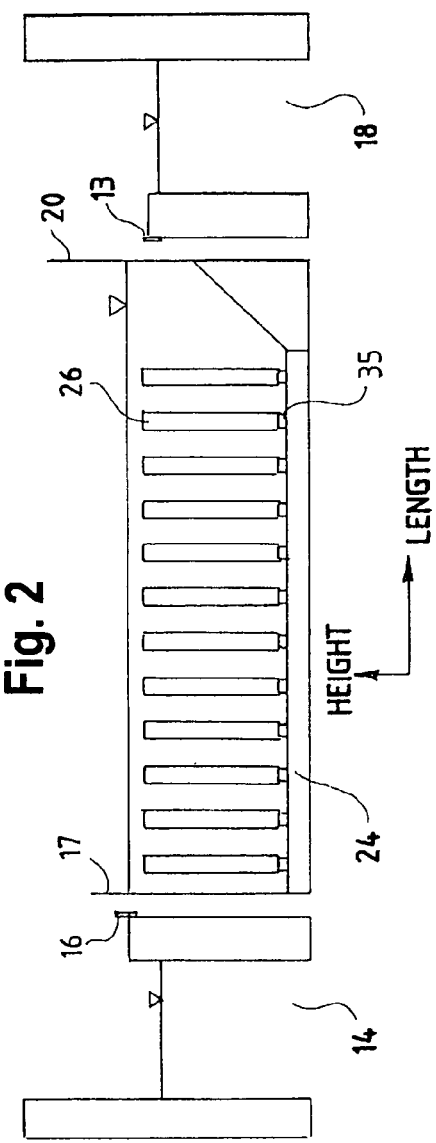
FIG. 2 is a side cross-sectional schematic view of a typical arrangement of a filtration region of a filtration basin of the present invention having an effluent baffle as a way to control water elevation in the system.
Figure 2A:
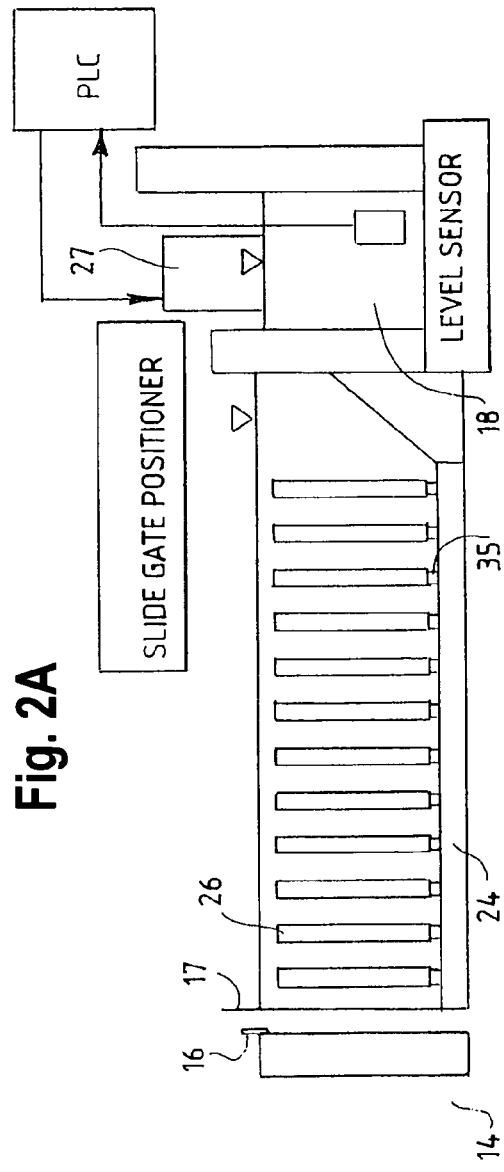
FIG. 2A is a side cross-sectional schematic view of a typical arrangement of a filtration region in a filtration basin of the present invention having an effluent slide gate as an alternative way to control water elevation in the system.
Figure 3:
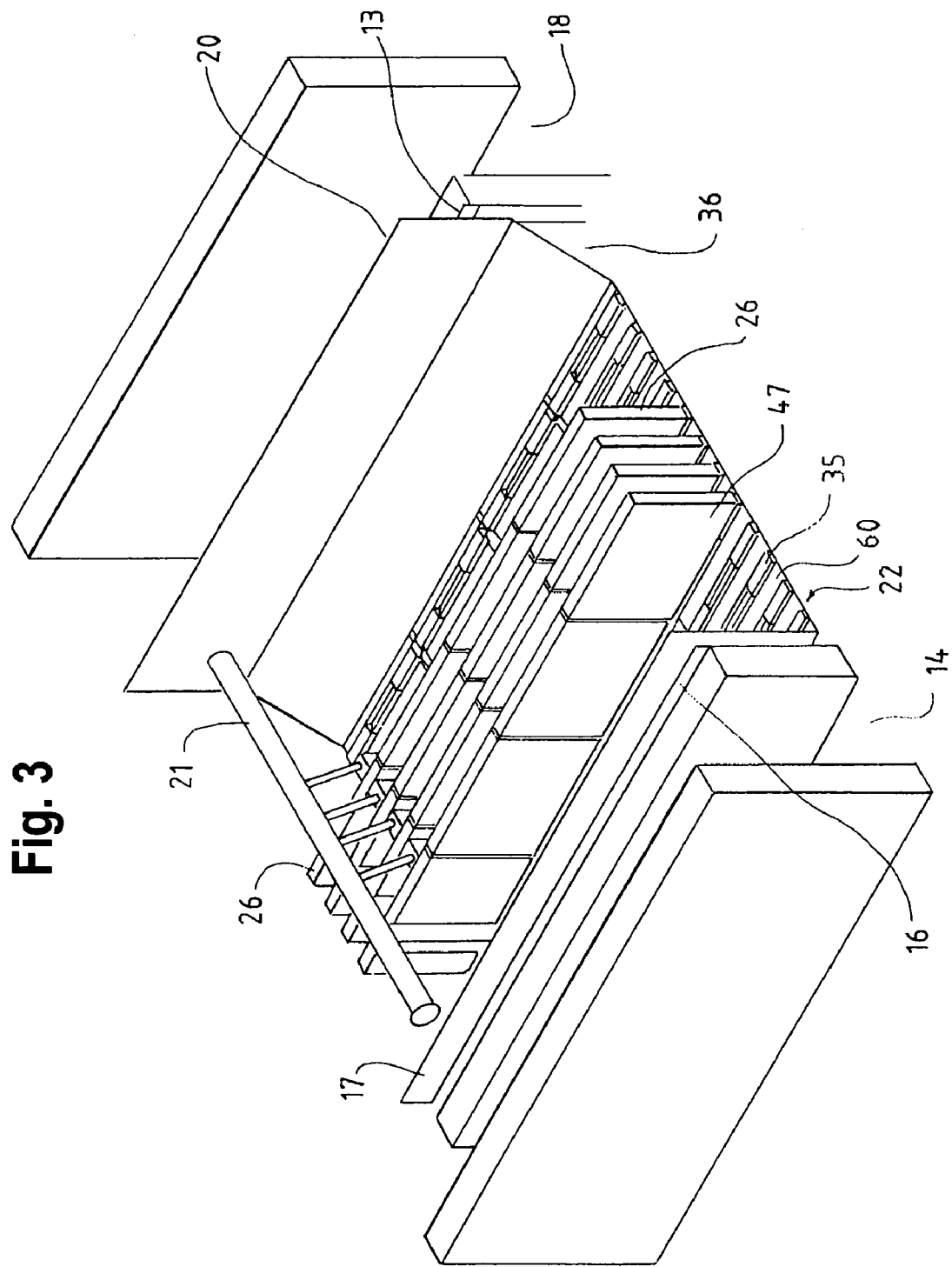
FIG. 3 is a perspective view of portions of the filtration region of the present invention showing the major overall components thereof.

In a preferred embodiment, and particularly the retrofit of an existing basin, the filtration basin 10 includes a bulk influent chamber 12 that receives the initial flow of water or wastewater to be treated. An influent channel 14 which feeds filtration region A, and an influent channel 15 which feeds filtration region B, are also provided. Influent channels 14 and 15 are responsible for conveying the influent from the upstream process via the bulk influent chamber 12 and distributing the influent along the entire length of a cloth media filtration region. An influent weir 16 (see e.g., FIGS. 2 and 3) may be provided along the length of each of the influent channels 14 and 15 to enable the control, adjustment and distribution of flow along the length of each of the filter regions. In addition, an influent baffle 17 (see e.g., FIGS. 2, 2A and 3) is provided along the length of a filter region to direct the influent flow to the bottom of the filter region for uniform flow distribution and filtration using stationary cloth media as hereinafter described. It will be understood by those of skill in the art that influent channels 14/15 may have a manual or an automatic slide gate(s) (not shown) to permit, among other things, water level control and filter isolation.

The filtration basin 10 also includes an effluent channel 18 that receives treated water or wastewater from filter region A, effluent channel 19 that receives treated wastewater from filter region B, and a bulk effluent chamber 11 that receives the treated effluent from effluent channels 18 and 19. Prior to the treated effluent reaching effluent channels 18 and 19, the effluent may be subject to an effluent baffle 20 and an effluent weir 13, both of which help control and distribute the flow as dictated by the requirement of a particular application. The effluent is then transferred to bulk effluent chamber 11 for discharge. In lieu of effluent baffle 20, an automatically controlled slide gate 27 and its associated components (not shown) may be positioned at the end of effluent channel 18/19 which is used to control the water level in and flow through the system (see FIG. 2A). When the system is used in this configuration, the effluent plenums 24 flow directly to the effluent channels 18/19. It will be understood by those of skill in the art that a wide variety of methods and devices may be used to control the system flow consistent with the present inventions.

The remainder of the discussion of the present inventions and preferred embodiments thereof that relate to stationary cloth filter media filtration will be by reference to a single cloth media filtration region, such as filter region A. The primary components that are part of or associated with a particular filtration region of the present invention may be seen by reference to FIGS. 1B and 3, and may include: an influent channel 14, influent plenums 22, effluent plenums 24, filter frame assemblies 26, also referred to as filter plates 26, an effluent channel 18 and a backwash system assembly 21, which is part of a traveling bridge assembly 23. Other embodiments may not include or require all such components, such as effluent plenums and/or influent plenums, as will be understood by those of skill in the art.

The structure and operation of influent plenums 22 and effluent plenums 24 may be understood by reference to FIGS. 4 through 10. The preferred embodiments of the effluent 24 and influent 22 plenums are shown and described, although other forms may be utilized consistent with the present invention. It is the combination of plenums 22/24 and their equivalents that provide uniform distribution of the influent flow across the filtration region, regardless of whether filtration is conducted according to the stationary cloth media filtration aspects of the present invention or other types of filtration systems. In its preferred form, uniform flow distribution is achieved by the influent and effluent channeling, which may include the control and distribution of flow from a single source and which is collected through a single source.

Figure 7:
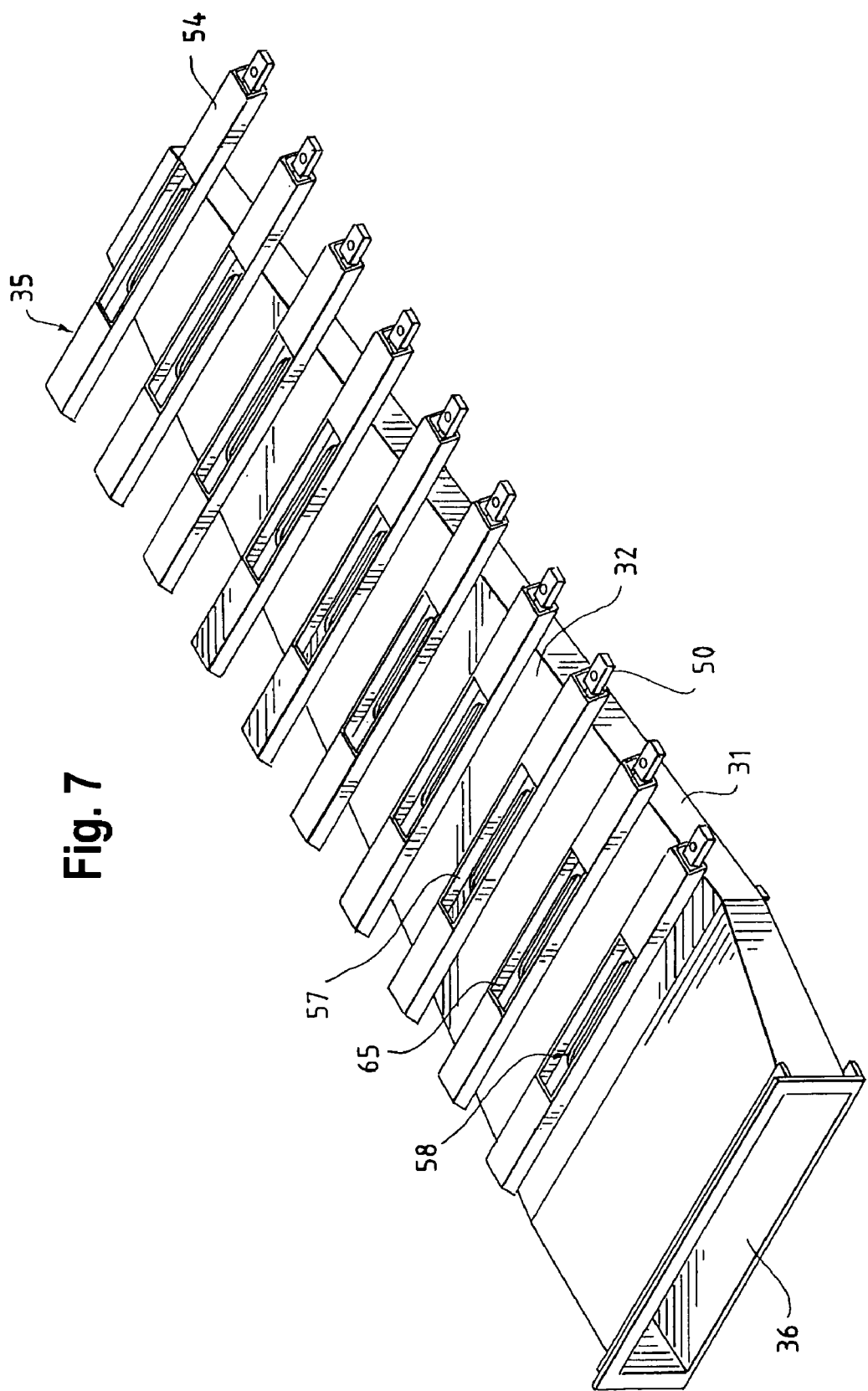
FIG. 7 is a perspective view of a preferred effluent plenum and an alternative arrangement of the associated filter frame support mounts of the present invention, also showing the effluent end of a preferred effluent plenum.

More specifically, in the preferred embodiments, each effluent plenum 24 is a generally trapezoidal shaped chamber that is sealed from the unfiltered influent flow and preferably constructed from a non-corrosive material, including but not limited to stainless steel. Each effluent plenum 24 includes a solid bottom plate 30, two solid side plates 31 (only one is shown in FIGS. 5, 6 and 7), and a top plate 32. Top plate 32 is provided with a series of oblong holes 33 that receive the filtered flow as hereinafter described. Aligned with each of the holes 33 is a filter frame support mount 35. Filter frame support mount 35 is affixed to the top of plate 32 of the effluent plenum 24 and functions to mount the filter frame assembly 26 to the effluent plenums 24, as well as helping to strengthen the structural integrity of the effluent plenums 24. As shown, for example, in FIG. 4, filter frame support mount 35 as well as the longitudinal axis of the oblong holes 33 are aligned perpendicular to the longitudinal axis of the effluent plenum 24. The filter plates 26 are then vertically mounted thereto as shown generally in FIGS. 7 and 8.

The preferred effluent plenums 24 have a closed end 34 and an open end 36, the open end 36 forming the effluent end of effluent plenum 24. Closed end 34, as well as bottom 30 and open end 36, are also provided with a flange 38 or other means to facilitate attachment and alignment of effluent plenum 24 to the bottom and/or side structure of the filtration region. Effluent plenum 24 is provided with an effluent flange 37, also to facilitate attachment of the effluent plenums 24 to the bottom and/or side structure of the filtration region. The effluent plenums 24 are arranged side-by-side in columns along the width of the bottom of the filtration region (see FIGS. 1A and 8-10). Specifically, in a preferred embodiment of the present invention, the longitudinal axis of effluent plenums 24 are aligned with the width of the cloth media filtration region and their length coincides with the width of the region (see e.g., FIGS. 1A and 3). The open or effluent ends 36 are adjacent to and are in fluid communication with the effluent channel 18 and the closed ends 34 are typically adjacent to the influent channel 14, where the influent baffle 17 or other means directs the influent to the bottom or lower portion of the system. As a result, the filter plates 26 are aligned in rows spanning the length of the filtration region which, as discussed herein, enables efficient backwashing and the like using a traveling bridge assembly 23. In other embodiments of the present invention, effluent plenums 24 as described are not required. In such situations, the filter plates 26 are in fluid communication through channels, pipes or other means 41 to the exterior of the system (see e.g., FIG. 33).

The influent plenums 22 are also trapezoidally shaped chambers that are complementary to and formed by the side-by-side effluent plenums 24. As shown in the drawings (see e.g., FIGS. 9 and 10), in a preferred form, influent plenums 22 are tapered channels formed from the pathway created between the sides 31 of effluent plenums 24, the bottom of the influent plenums 22 being preferably formed from the bottom of the cloth media filtration region or filtration basin (not shown). Influent plenum tops 73 may also be provided (see FIGS. 1A and 8-10) and which tops 73 form metering slots 60 as hereinafter described. The influent plenum tops 73 may be formed by a plate extending co-planar to the top surface 32 of the effluent plenum 24. It will be understood that the influent plenums 22 may be formed from separate components like the effluent plenums 24. However, this is not required, since only the effluent plenums 24 must be impervious to unfiltered flow. Similar to the formation of the influent plenums 22 from the side-by-side arrangement of the effluent plenums 24 along the bottom of the cloth media filtration region, a series of metering slots 60 are formed in the influent plenum top 73 along the upper portion of the influent plenums 22 as a result of the alignment and spacing of the plates 73 which form the top of influent plenums 22 and metering slots 60. It will also be understood by those of skill in the art that influent plenums 22 as described are not necessary for some embodiments (see e.g., FIGS. 32 and 33). In such embodiments, influent may simply be introduced into the filtration region or basin 10 by well known means, such as wiers, channels and the like.

With reference to FIGS. 6-8 and 14-15A, in a preferred embodiment of the present invention, filter frame support mount 35 is a tubular, generally rectangular member. A pin retaining plate 50 extends laterally outward from one end and may be attached to filter frame support mount 35 by welding or other well known means. Pin retaining plate 50 includes a key slot 51 which is bored or cut through plate 50. The underside of pin retaining plate 50 is provided with a longitudinal pin lock groove 52. Pin lock groove 52 is perpendicular to a key way 53 of key slot 51. The end 59 of filter frame support mount 35 opposite to the pin retaining plate end 50 remains open in a preferred embodiment. These elements function to mount the filter plate 26 to the effluent plenums 24.

The top 54 and bottom 55 surfaces in the central portion of filter frame support mount 35 are removed or cut away (or filter frame support mount 35 is simply assembled leaving an upwardly open sleeve 57), leaving only side surfaces 56. As indicated, this forms an upwardly facing open sleeve 57. Open sleeve 57 is slightly larger than the oblong hole 33 on the top plate 32 of effluent plenums 24, and is centered on filter frame support mount 35 so that it aligns with elongated hole 33 of effluent plenum 24 when the support mount 35 is welded or otherwise attached to the top plate 32 of effluent plenums 24. When attached to the effluent plenums 24 as described, the open sleeve 57 of filter frame support mount 35 forms a filter plate/effluent plenum interface shown generally as 58 (see FIG. 4). This interface 58 may be fitted with gaskets or seals to keep the influent from entering the effluent plenum 24 prior to filtration.

Figure 17:
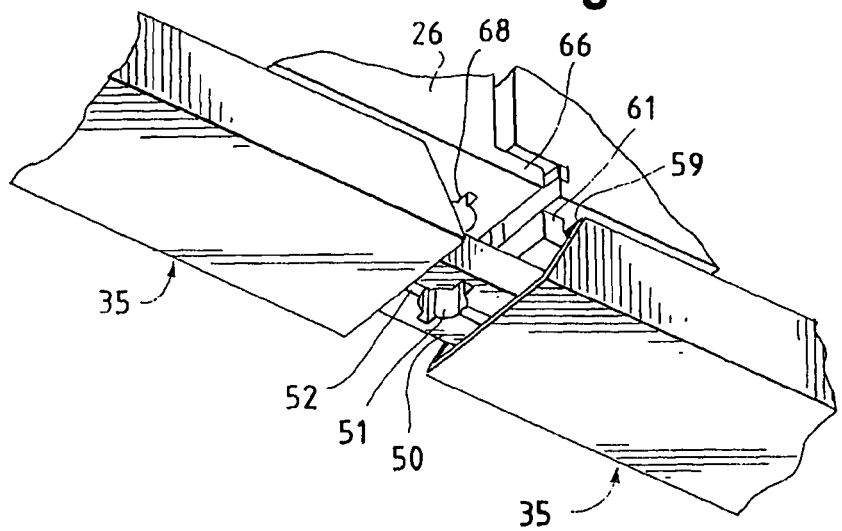
FIG. 17 is a bottom perspective view of two mating filter frame support mounts on adjacent effluent plenums, showing the open end of the filter frame support mount for receiving a portion of the pin retaining plate, and also showing components of a preferred pin retaining bracket of the present invention
Figure 18A:
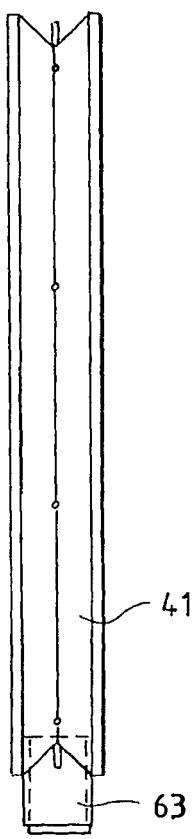
FIG. 18A is a side view of the filter frame assembly and a preferred interface between the filter frame and effluent plenum of FIG. 18.

As indicated, the end of filter frame support mount 35 opposite the end with the pin retaining plate 50 remains open 59. In this manner, when the effluent plenums 24 are arranged longitudinally along the width of the bottom of the filtration region, a portion of pin retaining plate 50 of one effluent plenum 24 is received within the opening of the corresponding filter frame support mount 35 of the adjacent effluent plenum 24 (see FIGS. 17 and 19).

Moreover, as shown in FIG. 4, pin retaining plate 50 may be located on alternate sides of the filter frame support mount 35. Specifically, in a preferred embodiment, half of the adjacent filter frame support mounts 35 may have the pin retaining plate 50 on one side and the remaining half of the filter frame support mounts 35 may have the pin retaining plate 50 on the other side. Similarly, the filter frame support mounts 35 on the adjacent effluent plenum 24 will have their pin retaining plate 50 on the opposite sides, so that the open ends 59 of filter frame support mount 35 mates with pin retaining plate 50 as described above (see e.g., FIGS. 4 and 9).

Figure 8:
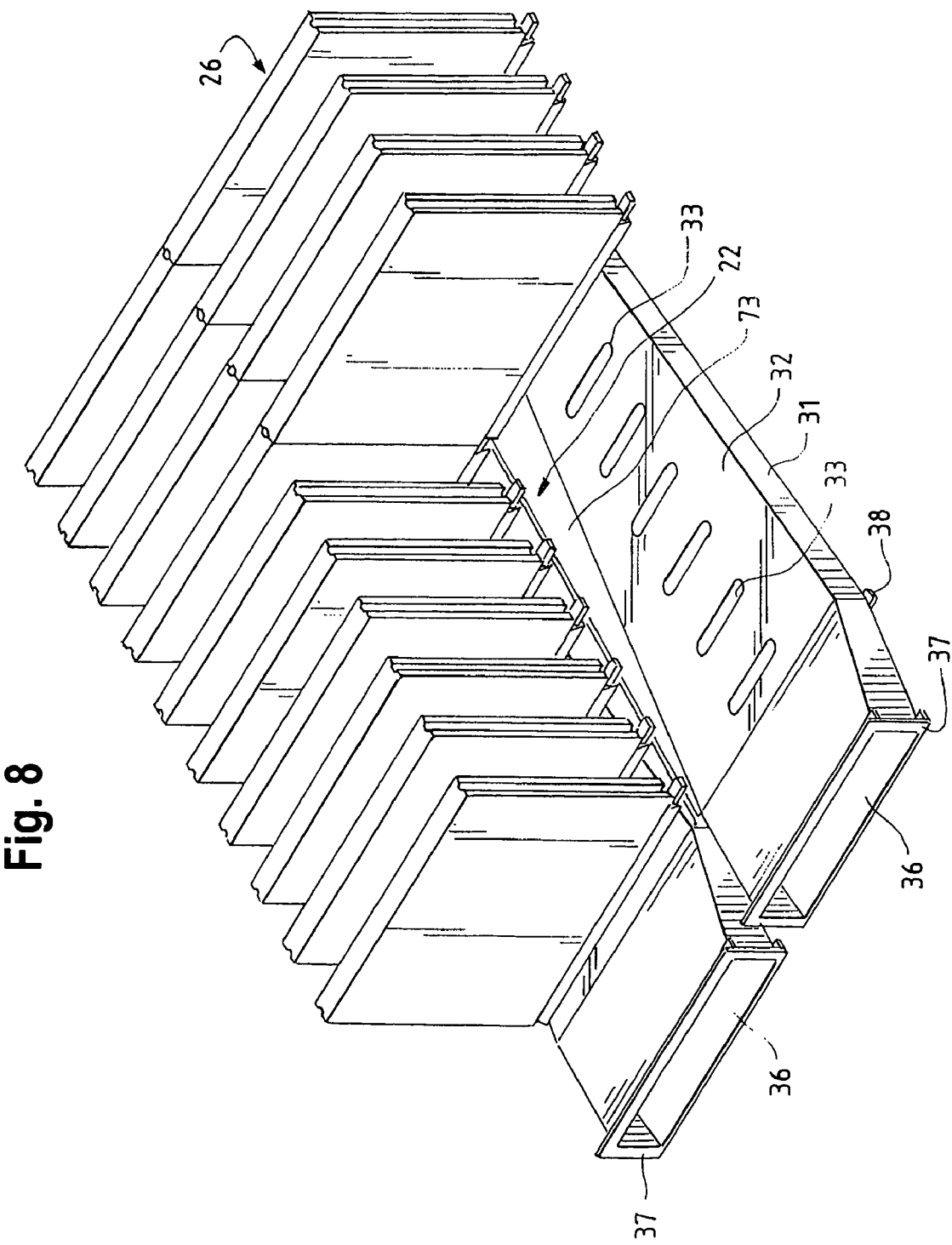
FIG. 8 is a perspective view of a preferred effluent plenum and an alternative arrangement of the associated filter frame support mounts of the present invention showing the effluent end of a preferred effluent plenum, the alternative arrangement of filter frame mounts on the effluent plenum and including schematic view of several of the filter frames engaged with their associated filter frame supports.
Figure 9:
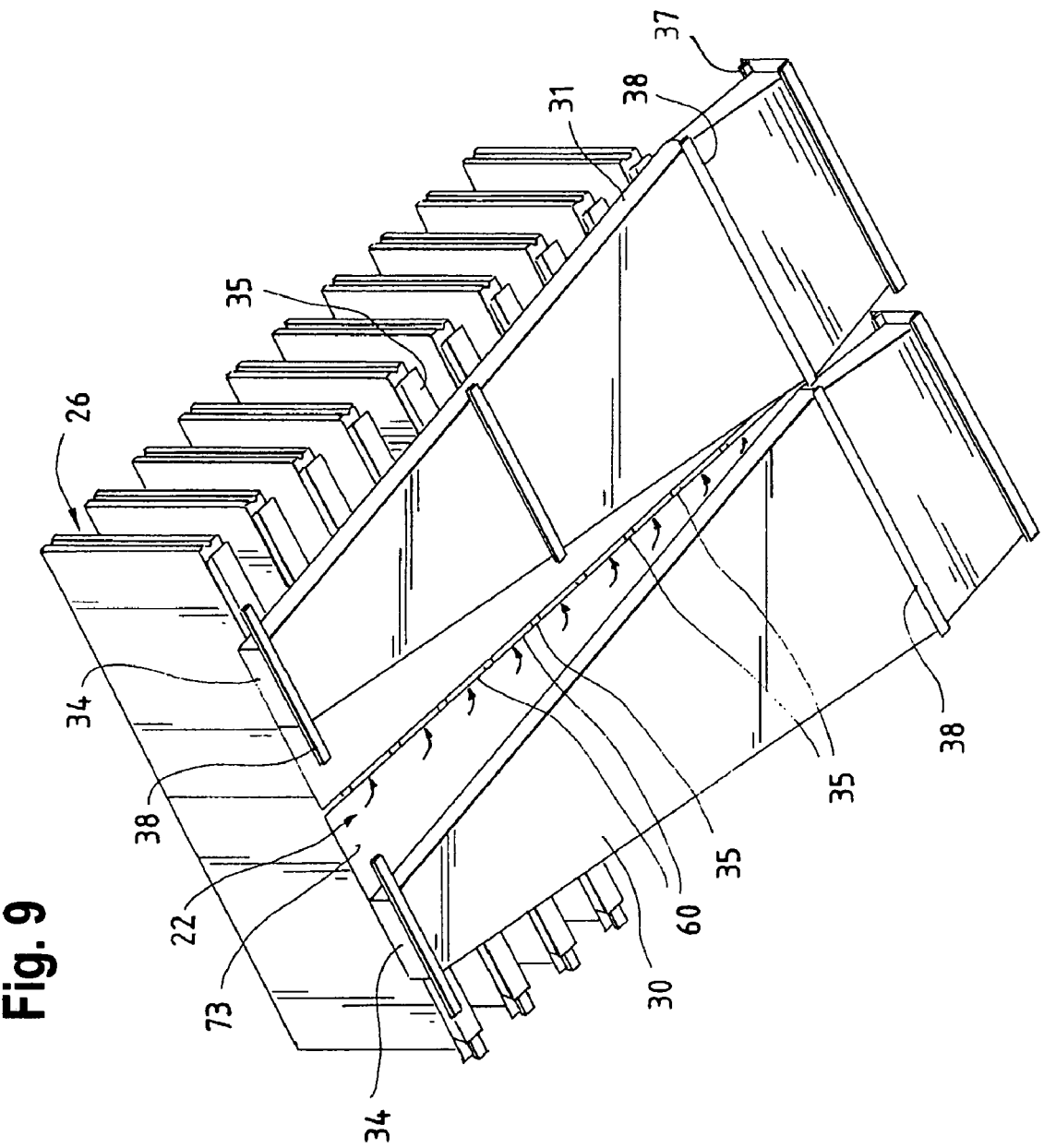
FIG. 9 is a bottom perspective view of a pair of adjacent effluent plenums looking up from below the representative plenums and showing an influent plenum of the present invention formed from the complimentary exterior of the adjacent effluent plenums.
Figure 10:
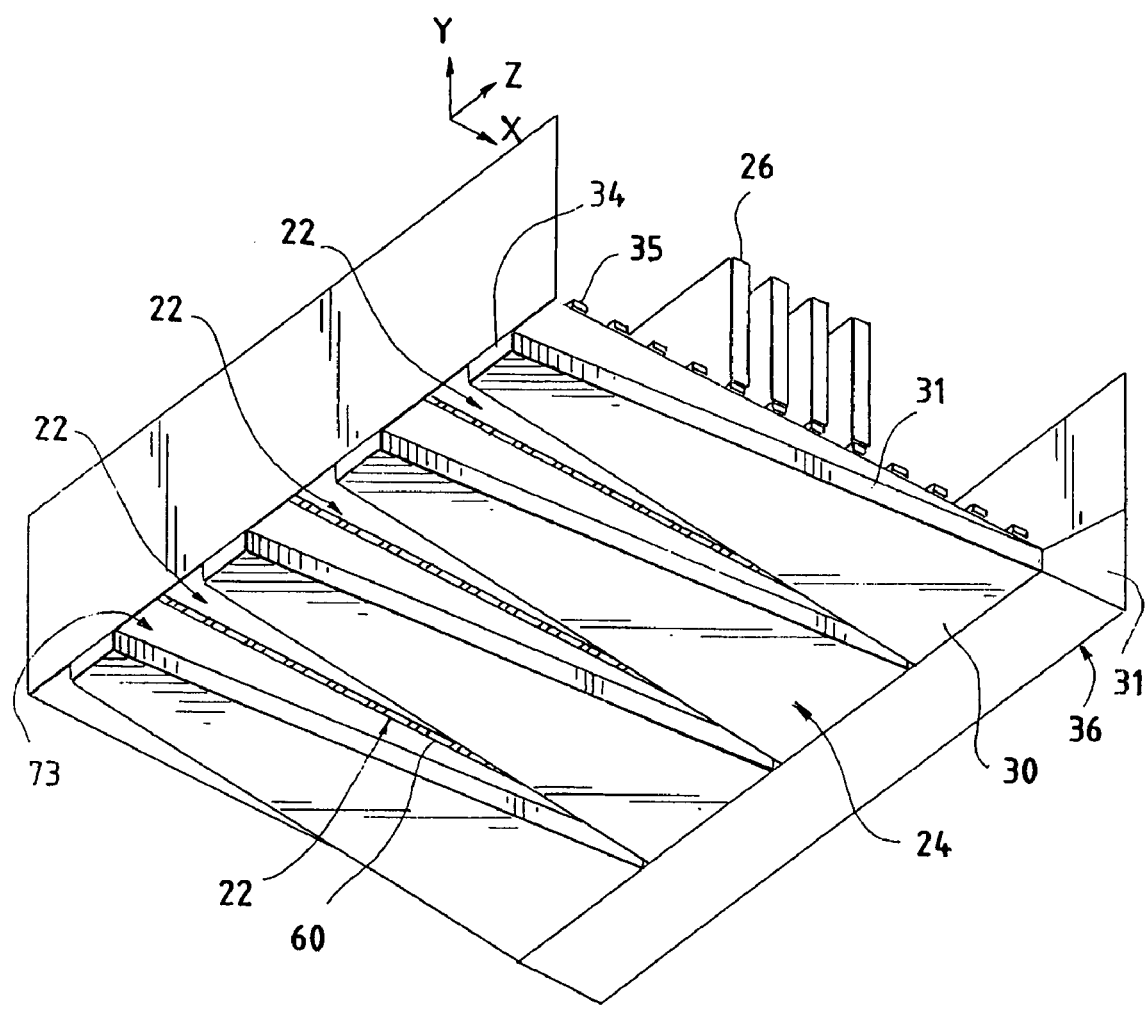
FIG. 10 is a bottom perspective view of additional adjacent effluent plenums of the present invention showing influent plenums formed from the complimentary exterior of the adjacent effluent plenums.

As referred to above, the openings or metering slots 60 of the influent plenums 22 are formed from the influent plenum tops 73, as best shown in FIGS. 8, 9 and 10. In this manner, and in conjunction with the taper shape of the influent plenums 22, influent exiting through the metering slots 60 is uniformly distributed within and across the width of the filtration region via the influent baffle 17 and influent plenum 22. Moreover, because of the taper of the trapezoidal influent plenums 22, even flow velocity is maintained and there is no tendency for solids to settle on the influent plenum 22 bottom.

Figure 26:
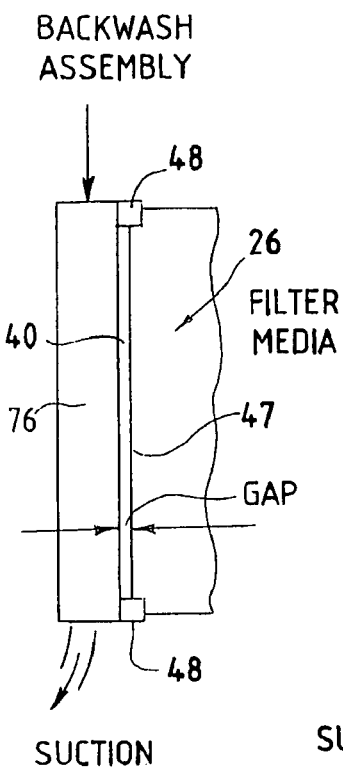
FIG. 26 is a side plan view of a backwash system of the present invention applied to a filter frame assembly, including cloth filter media, of the present invention.
Figure 27:
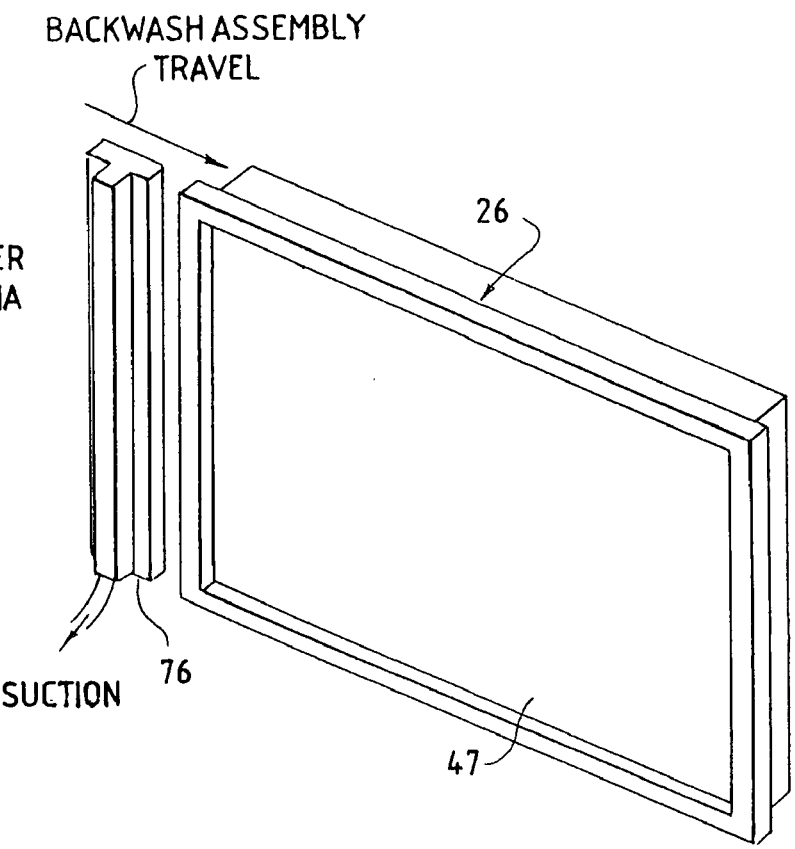
FIG. 27 is a side perspective view of the backwash system component of the present invention of FIG. 26.
Figure 28:
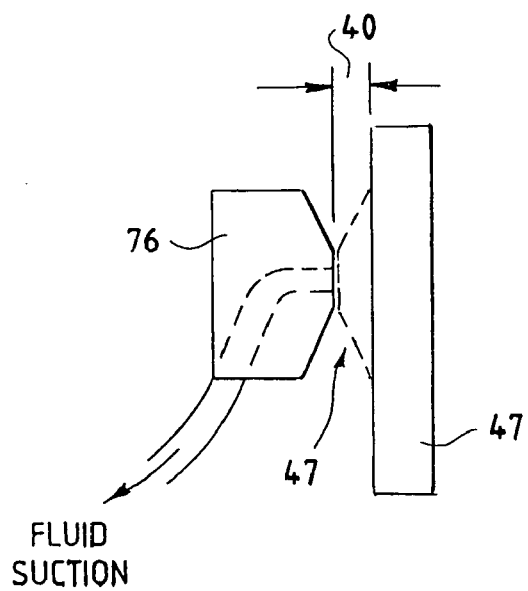
FIG. 28 is a side schematic view of the backwash operation of the present invention.
Figure 29:
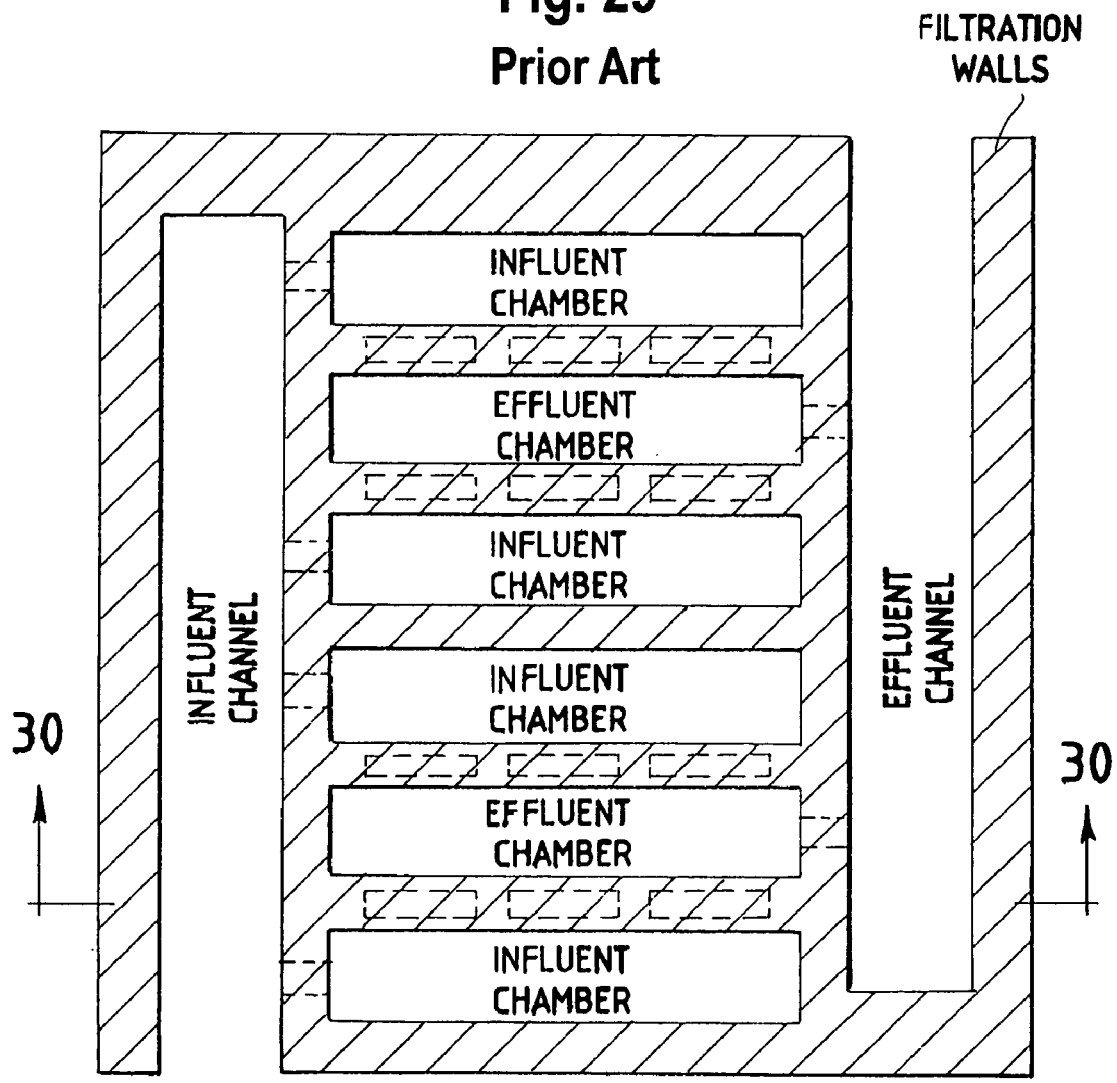
FIG. 29 is a schematic plan view of the general arrangement of a prior art cloth media filtration system.
Figure 30:
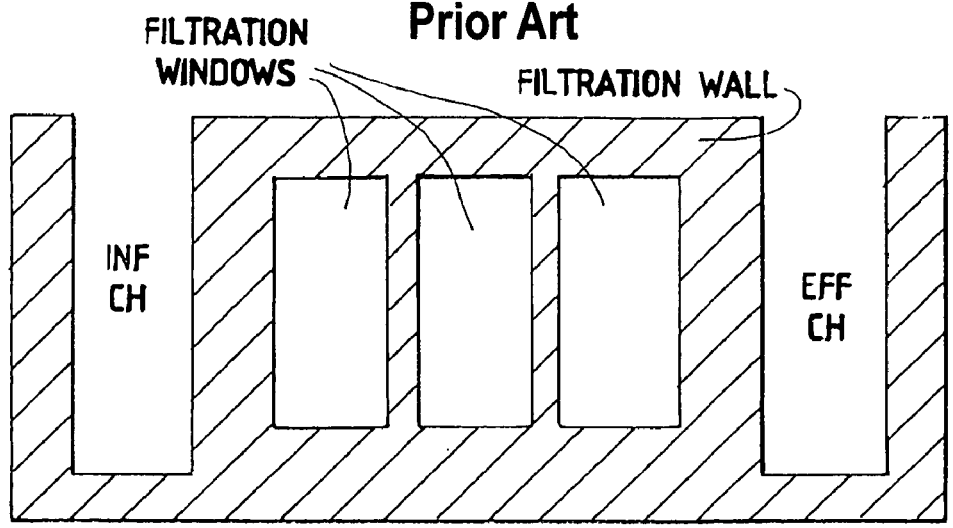
FIG. 30 is a schematic sectional view of a filtration wall and windows of the prior art filtration system taken along line A-A of FIG. 29.
Figure 31:
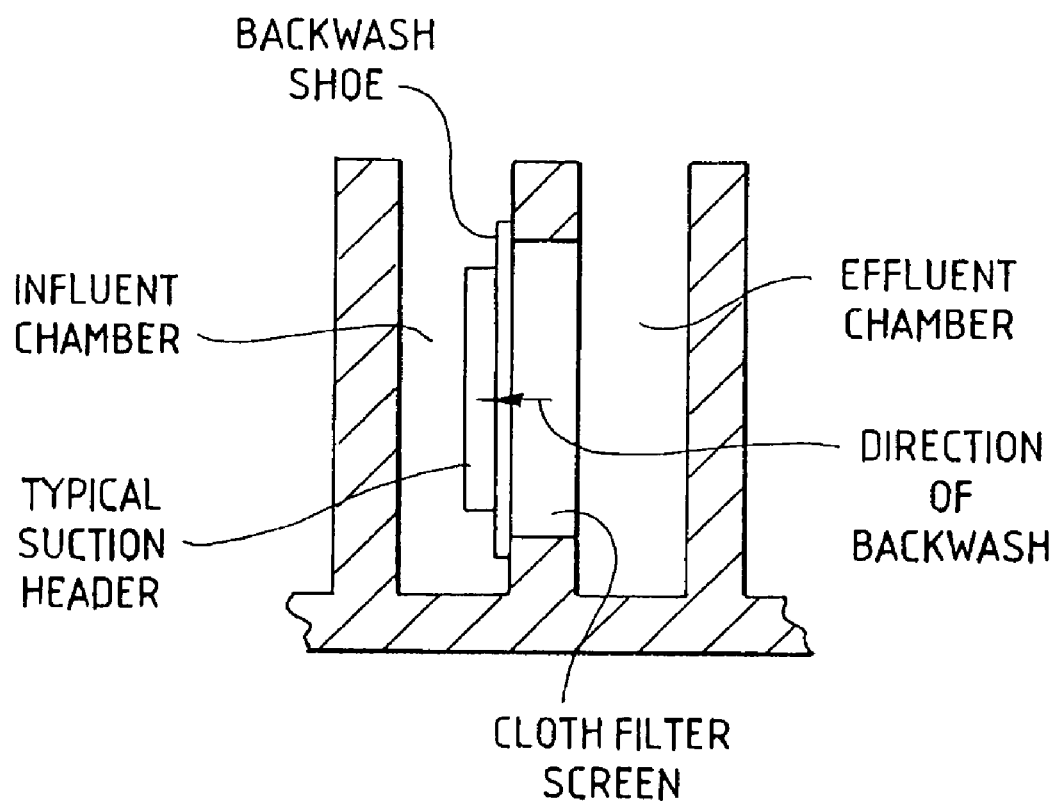
FIG. 31 is a schematic side view of a typical prior art suction header and shoe for backwashing cloth filter media showing direct contact between the suction header and cloth filter media.

The design and structure of filter plate 26 may best be seen by reference to FIGS. 11-13 and 18-18A. As shown, each filter plate or, more generally, filter frame assembly 26 is a generally rectangular frame with a hollow center and consists of side members 41, top member 42 and bottom member 43. A handle or handles 44 attached to top member 42 may also be provided to aid installation, maintenance and/or repair. The side 41, top 42 and bottom 43 members of filter plate 26 form a rectangular box-like structure, the front and back faces 45 of which are fitted with a support screen 46. Cloth filter media 47 (see e.g., FIG. 3) may be stretched across and attached to the front and rear faces 45. However, in a preferred embodiment, cloth media 47 is stretched around the whole filter frame assembly 26 which eliminates the risk of unfiltered influent into the effluent plenums 24. Also included are generally v-shaped (in cross-section) top and bottom tensioners 48. Similarly, the side members 41 are provided with side tensioners 49. The support screens 46 function to help the cloth filter media 47 from deforming to the hollow center of filter plate 26, and the tensioners 48 and 49 provide tension to the cloth filter media 47 to form a taught diaphragm for filtering. In addition, top and bottom tensioners 48 act as a rail along the faces 45 of filter plate 26 to create a gap to protect the cloth filter media 47 during backwash operations and to prevent pre-loading as discussed herein. This adjustable or settable gap 40 is shown schematically in FIGS. 26-28. In preferred embodiments of the rotating backwash arm assembly 200, maintaining gap 40 as described herein to avoid preload is not required, as a non-contact mode for shoe attachment assembly 203 may be necessary for clearance during movement of rotating backwash arm 200.

The bottom frame member 43 includes an oblong hole 62 (see FIG. 18) that is positioned and sized to communicate with oblong hole 33 on the top 32 of effluent plenum 24. A collar 63 extends downwardly from and is coincidental with oblong hole 62. Collar 63 is designed to fit within and create a water-tight seal with the open sleeve 57 of filter frame support mount 35 and completes the filter plate/effluent plenum interface 58. In this manner, untreated influent passes through the cloth filter media 47, is filtered and the filtered effluent passes through oblong hole 62 of bottom frame member 43, into oblong hole 33 into effluent plenum 24, as hereinafter described in more detail. In this manner, there is only one area of possible penetration of influent flow into the effluent plenum 24.

Figure 33:
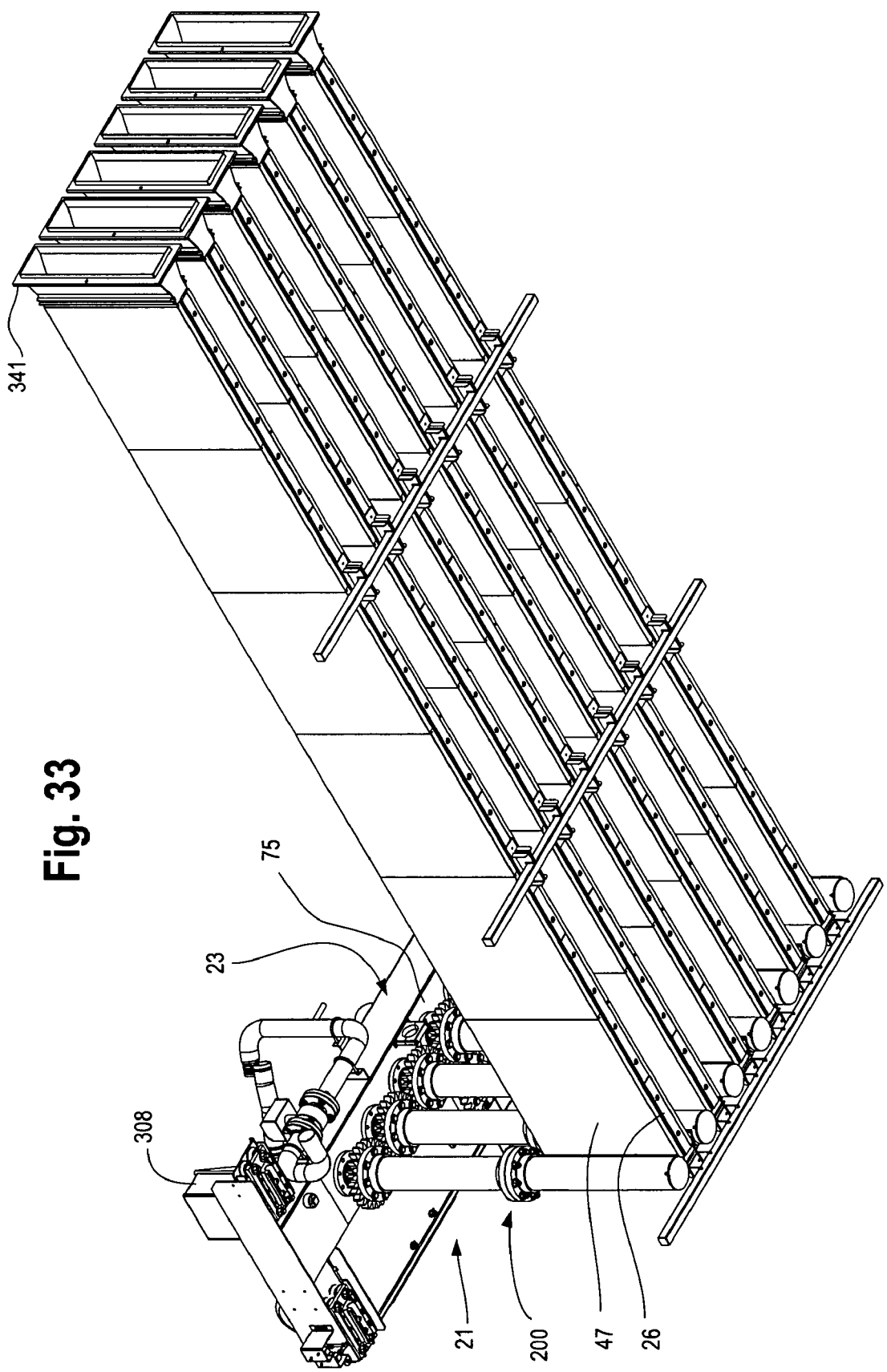
FIG. 33 is a bottom perspective view of a preferred backwash system of FIG. 32 the present invention with the tank or filtration basin components removed to show preferred rotating arm assemblies and their orientation relative to typical longitudinal spaced rows of filter plates.
Figure 34:
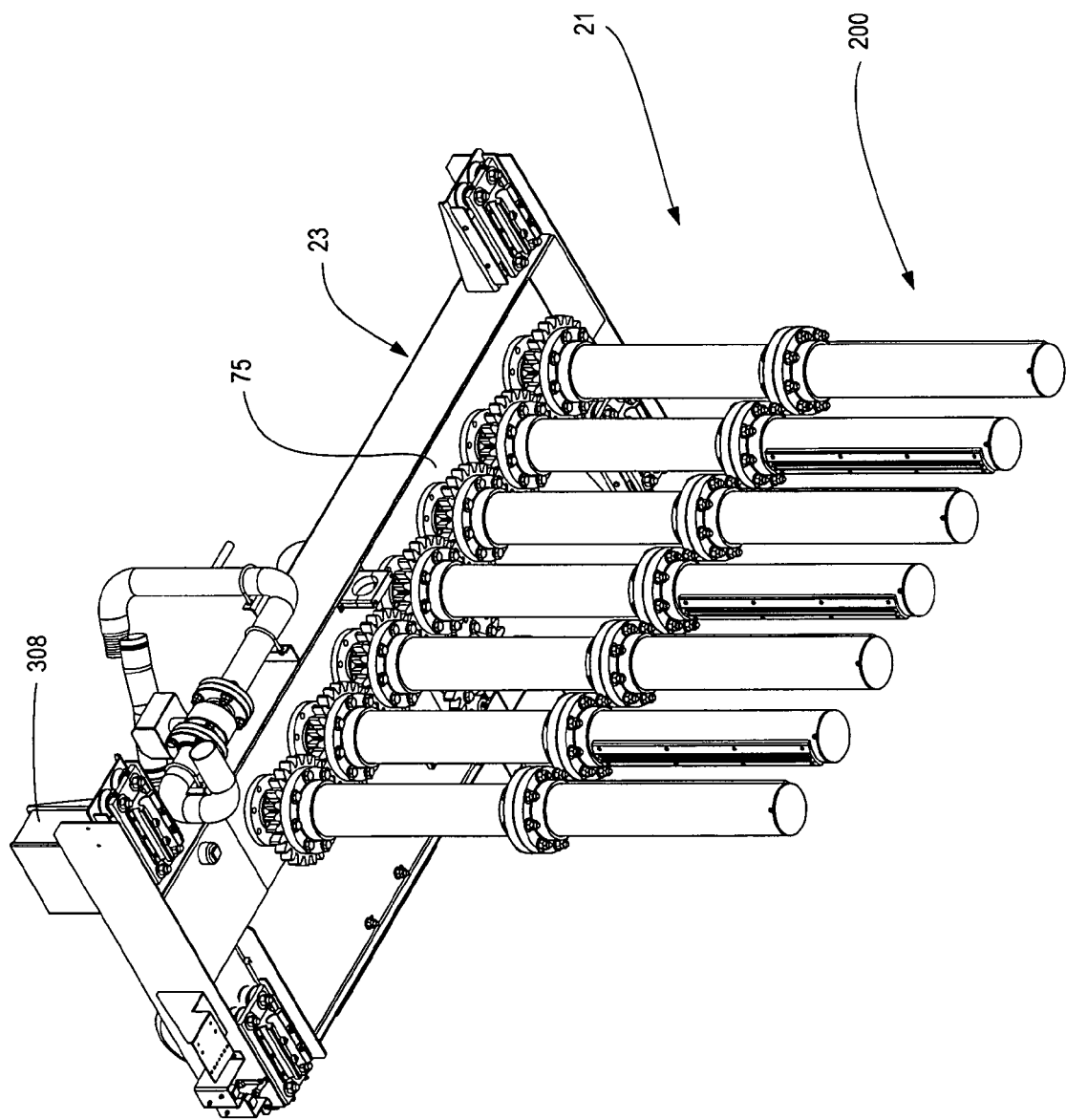
FIG. 34 is a bottom perspective view of a preferred embodiment of the rotating backwash arms of FIG. 32 connected to a typical traveling bridge assembly.

In a preferred embodiment of the present invention, each filter plate 26 is attached to the filter frame support mount 35, and hence, in fluid communication with effluent plenum 24, through the use of a single fastener. Specifically, collar 63 is provided with a plate latch 64. Plate latch 64 is essentially a tab or other similar member extending from one end of collar 63 that is designed to fit under and mate with edge 65 of filter frame support mount 35 (e.g., FIGS. 14 and 15). As a result, plate latch 64 acts as a hinge to restrain one end of collar 63 of filter plate 26. As described herein, in embodiments of rotating backwash arm assembly 200, particular effluent plenums 24 are not required and the filter effluent may be discharged through conduit 341 as shown in FIG. 33.

Figure 17A:
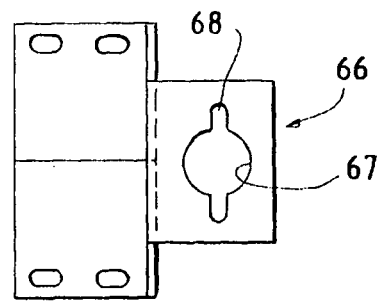
FIG. 17A is a top plan view of a preferred pin retaining bracket of a filter frame assembly of the present invention.
Figure 18:
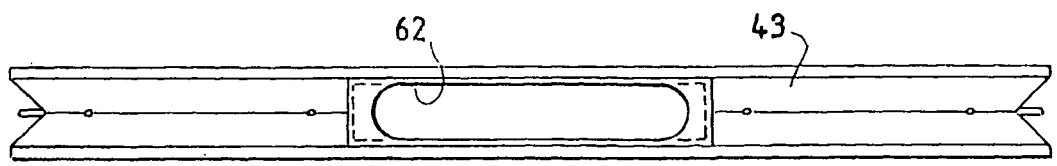
FIG. 18 is a bottom view of the filter frame assembly showing a preferred interface between the filter frame and effluent plenum.
Figure 21:
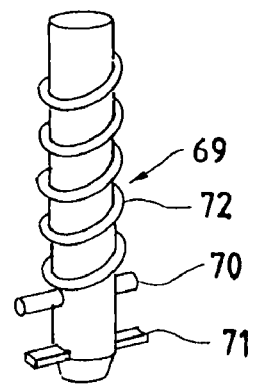
FIG. 21 is a side plan view of a spring loaded fastener of the present invention used to secure the filter frame assembly to the filter frame support mount.

At the end of the bottom member 43 of filter plate 26 opposite latch plate 64, a pin retaining bracket 66 is provided (see FIGS. 14 and 15). Pin retaining bracket 66 includes a key slot 67 and a key way 68 that aligns and mates with key slot 51 and key way 53 of pin retaining plate 50 of filter frame support member 35 (see FIGS. 17-17A and 19). Pin retaining bracket 66 is secured to pin retaining plate 50 through the use of a spring loaded fastener 69. Specifically, in a preferred embodiment, spring loaded fastener includes a pin 70 with a key 71 at one end, and a compressive spring 72 at the other. Thus, in order to secure the pin retaining bracket 66 to pin retaining plate 50, pin 70 is inserted into key slot 67 and key slot 51 so that key 71 passes through key ways 53 and 68. The pin 70 is then rotated so that key 71 engages pin lock groove 52, securing the bracket 66 and plate 50 together. In order to ensure a watertight seal at the plenum/plate interface 58, a closed cell foam gasket seal (not shown) or other suitable gasket may be used. Similarly, each filter plate 26 may include an alignment tab 61 on the end opposite the pin retaining bracket 66. Alignment tab 61 serves to keep adjacent filter plates 26 in alignment on adjacent filter frame support mount 35 of adjacent effluent plenums 24 (see FIG. 17). Other forms of adjustment and retention will be apparent to those of skill in the art.

Having described the majority of the principal components of the present inventions, the typical operation of a preferred embodiment may now be discussed. Specifically, in operation of a preferred embodiment, influent is introduced into bulk influent chamber 12 and is divided between influent channels 14 and 15 (e.g., FIG. 1A). However, only one filtration region (A) will be discussed. The influent flows over influent weir 16 and is diverted via influent baffle 17 to the bottom of the filtration region (see also FIGS. 2-3). The influent flows up through metering slots 60 created by (or alternatively, in) the influent tops 73. As a result of the shape of influent plenum 22, the influent is uniformly distributed over the entire width of the filtration region. The influent then flows through the cloth media 47 of filter plate 26 and is filtered. The filtered flow flows into the sealed effluent plenums 24 via the filter plate/plenum interface 58 and is collected in effluent channel 18, either through the use of an effluent baffle 20 arrangement or an automatic slide gate 27 arrangement.

Since the cloth media 47 becomes clogged over time, it is necessary to periodically backwash the cloth filter media 47.

Figure 22:
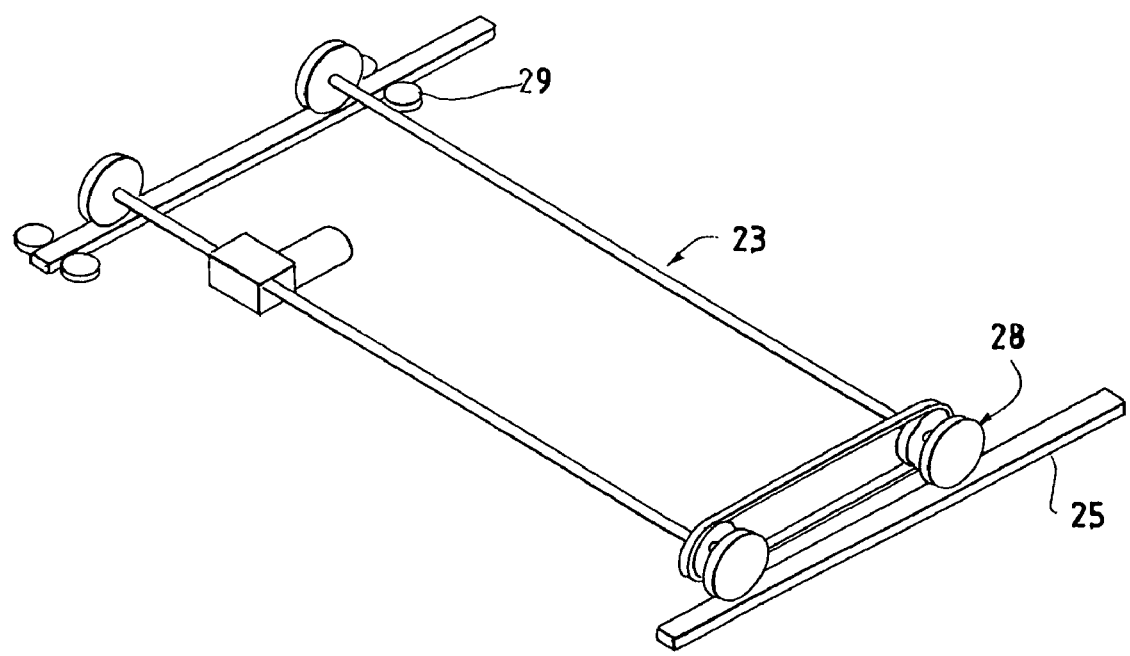
FIG. 22 is a schematic view of the general configuration of the motion imparting components of a typical traveling bridge assembly of the present invention.
Figure 23:
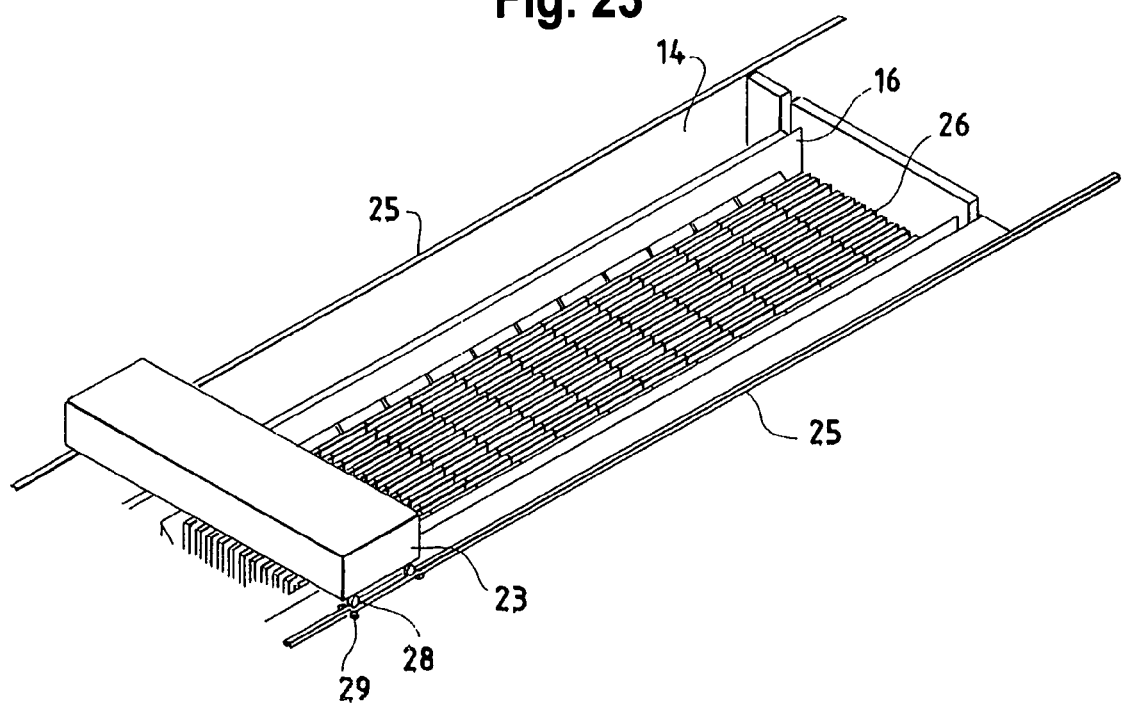
FIG. 23 is a perspective view of the general configuration of a typical traveling bridge assembly of the present invention shown in a first position.
Figure 24:
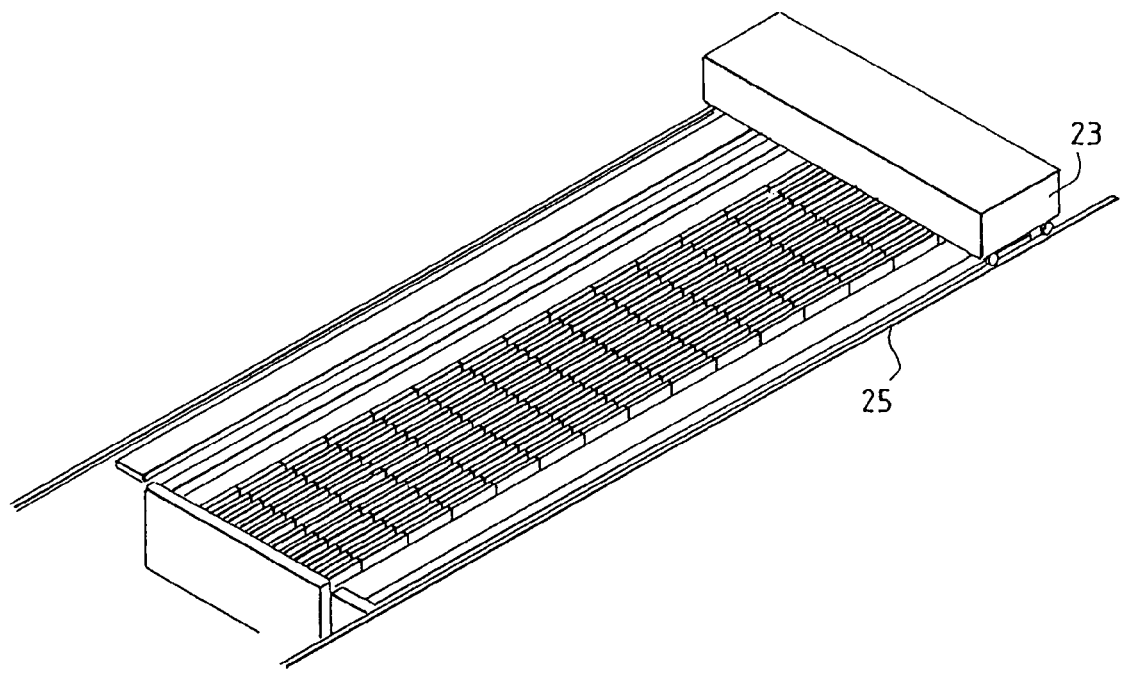
FIG. 24 is a perspective view of the general configuration of a typical traveling bridge assembly of the present invention shown in a second position.

A traveling bridge assembly 23 is used to house and carry the necessary components for backwashing and other operations. In general, traveling bridge assembly 23 travels along the length of a filtration region (or filtration basin 10) from a first position (FIG. 23) to a second position (FIG. 24), and back again. Traveling bridge assembly 23 may include wheels 28 that roll along rails 25 on top of filtration basin 10. Alignment wheels 29 (see FIG. 22) may also be included to help guide and align traveling bridge assembly 23 during travel.

Preferred embodiments of the backwash system 21 of the present invention may better be seen by reference to FIGS. 25-45. In general, the backwash system assembly includes suction headers 75 connected to a suction pump 308. A backwash shoe 76 is positioned to ride along the cloth filter media 47 on the front and back faces 45 of each of the adjacent rows of filter plates 26. In a preferred embodiment of the present invention, backwash shoe 76 rides along top and bottom tensioners 48 of filter frame assembly 26, thereby producing a gap 40 between the cloth filter media 47. This reduces wear on the cloth filter media 47 and eliminates preload and its associated problems. In another preferred embodiment, the backwash system includes a rotating backwash arm 200 (FIGS. 32-48).

Thus, during a typical backwash operation, the backwash shoes 76 are pulled along the longitudinal rows of filter plates 26 by traveling bridge assembly 23 and its associated backwash headers 75 of backwash assembly 21. In a preferred embodiment of the present invention, only half of a row of filter plates is backwashed in each direction of travel of the traveling bridge 23. That is why, in a preferred embodiment, half of the pin retaining plates 50 are on one side and half on the other side of the filter frame support mount 35. Backwashing will also start and stop at the same place as the traveling bridge assembly moves from its first to second position and returns.

Figure 25:
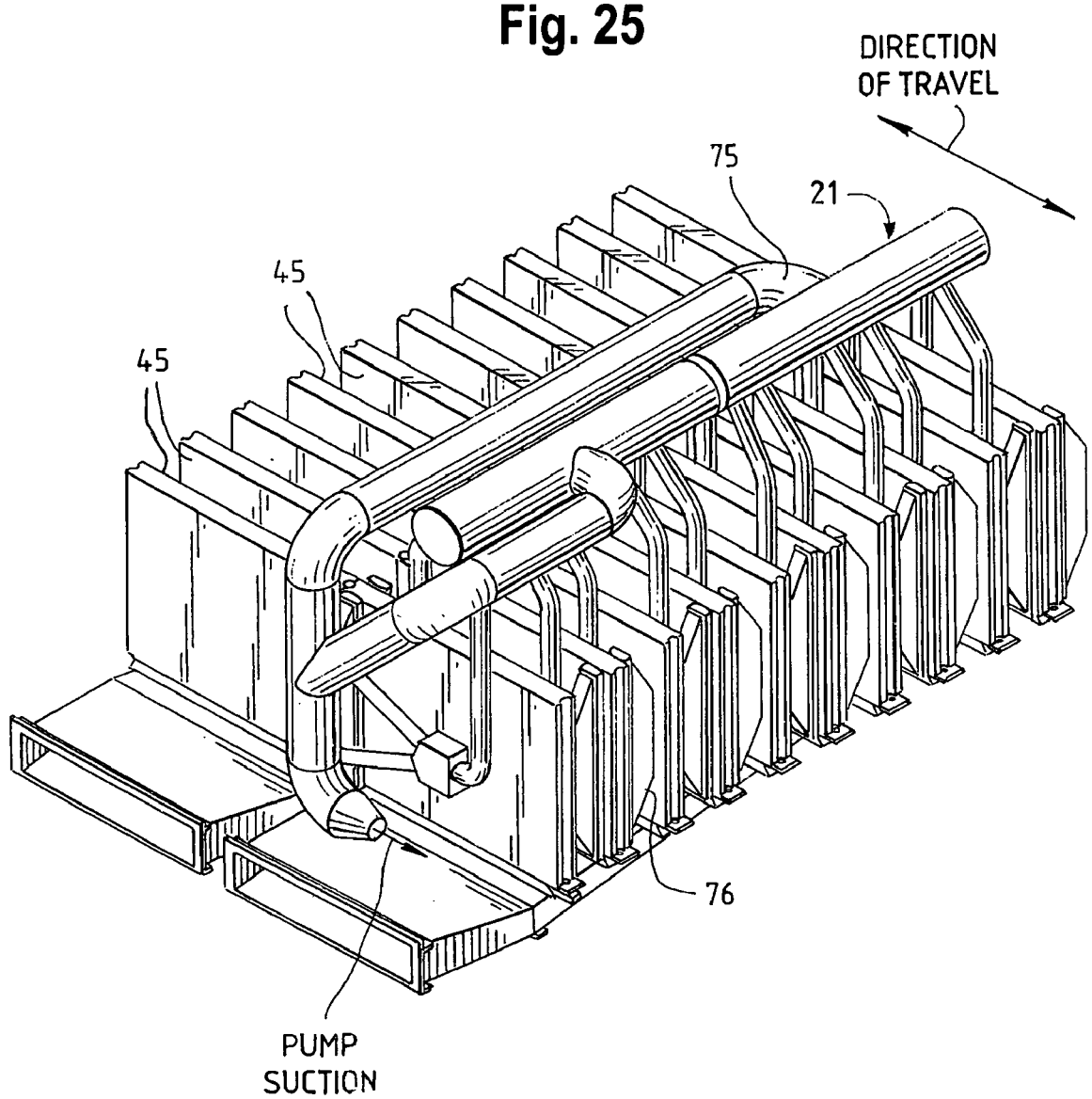
FIG. 25 is a side perspective view of selected components of a typical traveling bridge assembly showing the overall backwash system components of the present invention.

The embodiment shown schematically in FIG. 25 is representative of one preferred embodiment. In such a system, there are, for example, ten parallel spaced, longitudinal rows of filter plates 26 having cloth filter media on both sides. To conduct the backwash operation, twenty backwash arms are required, one for each side of plate filter 26. And, to conduct the typical backwash operation in each direction of travel as discussed above, a series of sequencing valves (not shown) are required to apply suction to the appropriate arm conducting the backwash operation in any given direction. Complicated wiring is also required to control the sequencing valves.

In another preferred embodiment, an improved backwash assembly 21 having a rotating backwash arm 200 is provided (FIGS. 32-48). In general, rotating backwash arm 200 enables the cleaning of multiple cloth filter media surfaces 47 on opposing rows of filter plates 26. As a result, fewer arms are required, sequencing valves may be eliminated and control wiring simplified. The improved backwash assembly 21 is typically included as part of a traveling bridge assembly 23 which may also act as a common suction header/manifold 75 as hereinafter described. As discussed herein, rotating backwash arm assembly 200 may be used to clean the cloth filter media 47 of filter plates 26 or other stationary cloth media filtration systems. For example, it will be understood by those of skill in the art that the improved backwash assembly 21 is applicable to a wide variety of stationary cloth media filtration devices having spaced, parallel rows of cloth filtration media 47, not just the plates 26 as described herein. In addition, the preferred influent 22 and/or effluent 24 plenums are optional, not required.

A representative of another preferred embodiment will be discussed herein for a filtration region of another typical stationary cloth media filtration system having six longitudinal rows of filter frame assemblies 26 covered with cloth filter media 47 on each side, as shown generally in FIGS. 32-35. As shown in FIG. 32, the present invention is discussed in relation to a tank system. It will be understood by those of skill in the art, however, that the invention may be applied to concrete basins and a wide variety of other cloth filter media systems and set-ups. In a system with six rows of filter plates 26, seven rotating arm assemblies 200 are required: one between each adjacent row of filter plates 26 and one on the outside of each of the last rows of filter plates 26. In contrast, known backwash systems in similar arrangements with six rows of filter plates 26 would require twelve backwash arms and shoes, as well as sequencing valves and the like, to conduct the same backwash operation of the present inventions.

Figure 35:
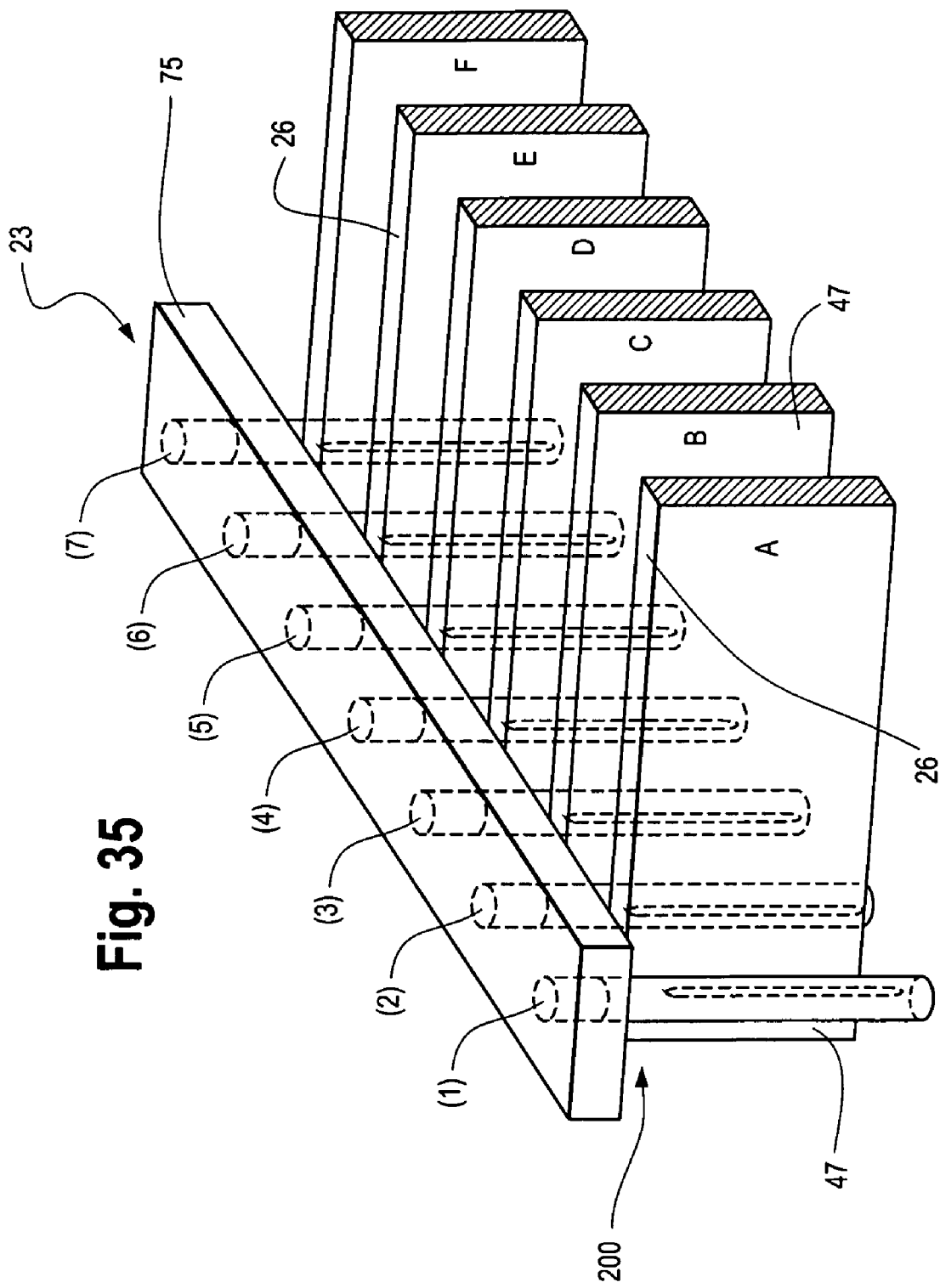
FIG. 35 is a schematic view showing the general arrangement of a preferred embodiment of the present invention of the rotating arms in relation to the cloth filter media.

The general operation of a preferred embodiment of rotating backwash arm assembly 200 is shown schematically in FIG. 35. During the backwash operation, bridge 23 moves from a first position (see e.g., FIG. 23) to a second position (see e.g., FIG. 24) or from left to right in FIG. 35. In a preferred embodiment, as the traveling bridge assembly 23 moves to the right in the schematic of FIG. 35, rotating backwash arm assembly 200 is positioned so that arms (1) and (2) clean the cloth filter media 47 on the sides of filter plate 26 (A); rotating backwash arms 200 (3) and (4) clean the cloth filter media 47 on the sides of filter plate 26 (C); and, rotating backwash arms 200 (5) and (6) clean the cloth filter media 47 on sides with filter plate 26 (E). In this direction, arm (7) is closed to suction until the return direction. At the end of travel, the rotating backwash arms 200 are rotated 180° using a drive motor or means 350 to rotate the drive gears 351 as hereinafter described. On the return travel to the left of the FIG. 35 schematic, rotating backwash arms 200 (2) and (3) clean the cloth filter media 47 of filter plate 26 (B); arms (3) and (4) clean cloth filter media 47 on the sides of filter plate 47 (D); and, arms (6) and (7) clean the sides of filter plate 47 (F). In this direction, the outside rotating backwash arm 200 (1) is optionally blocked-off from the backwash operation since it is no longer in a position to backwash cloth filter media 47, also as hereinafter described.

The structure, orientation and operation of preferred components of the improved backwash assembly 21 will be described. Rotating backwash arm 200 has two principal structural components in its preferred form; namely, sealed rotation assembly 202 and shoe attachment assembly 203. Rotating backwash arm assembly 200 is rotatably mounted to and in fluid communication with fixed attachment assembly 201, which is in fluid communication with suction manifold 75. These assemblies are shown generally in FIGS. 36, 37 and 44. It will be understood by those of skill in the art that rotating arm assembly 200 may be one piece or more than two pieces. Similarly, other ways of mounting rotating arm 200 to the traveling bridge assembly 23 and suction header 75 are also contemplated. However, for reasons of strength, installation and efficiency, the examples described herein are preferred.

Figure 38:
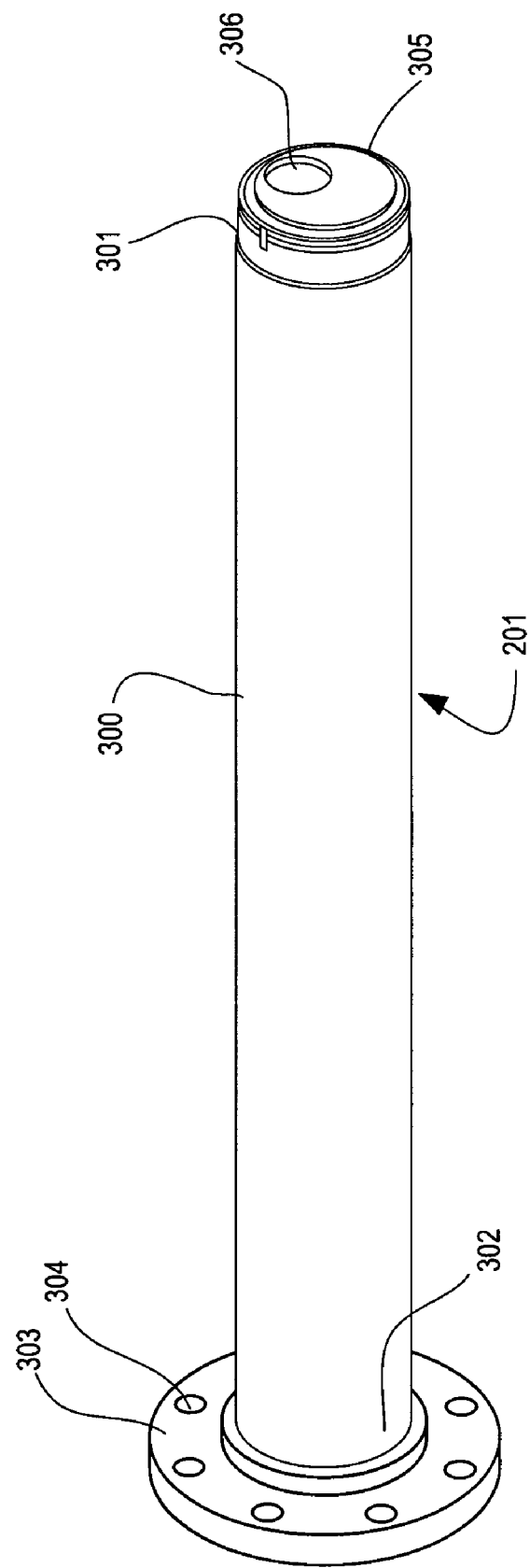
FIG. 38 is a perspective view of a preferred fixed attachment assembly of the present invention, shown with an optional valve plate for use with a backwash arm that is on the outside row of filter plates.
Figure 39:
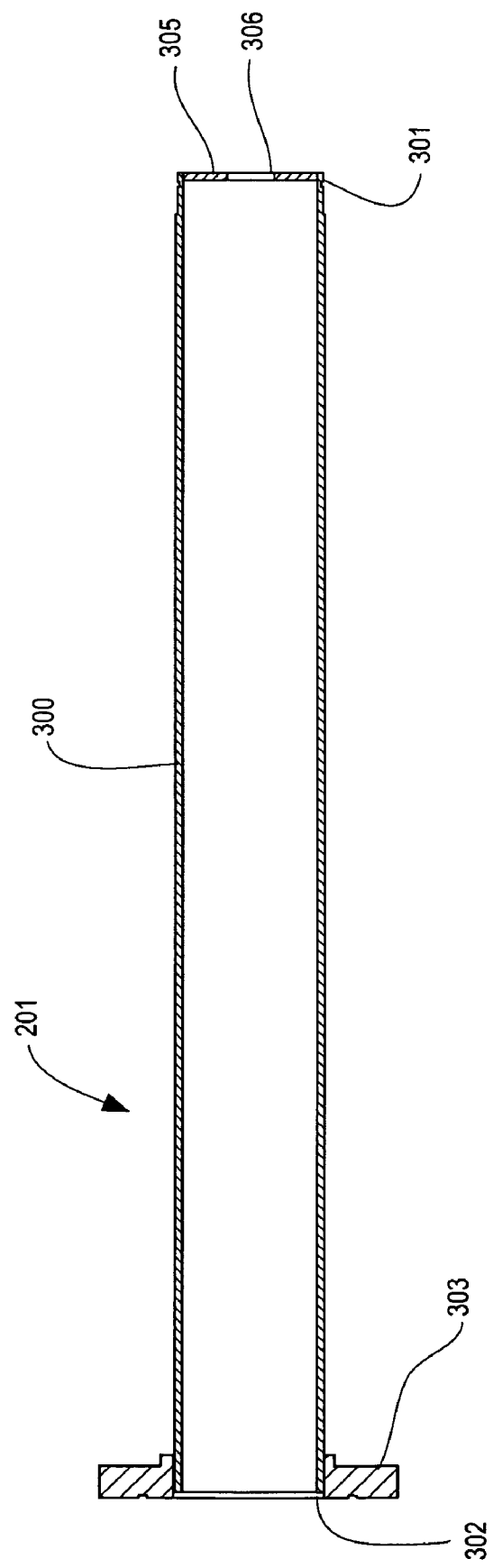
FIG. 39 is a side cross-sectional view of the preferred fixed attachment assembly of FIG. 38.

A preferred embodiment of fixed attachment assembly 201 is more particularly shown in FIGS. 38 and 39. Fixed attachment assembly 201 includes a pipe 300 having a proximal end 302 which is closest to the traveling bridge assembly 23 and a distal end 301 suspended downward from the traveling bridge assembly 23. Proximal end 302 is adapted to be connected to traveling bridge assembly 23 and to be in fluid communication with common suction header 75 (see e.g., FIGS. 33, 34 and 45). In a preferred embodiment, proximal end 302 is provided with a header flange 303 having bolt holes 304. Flange 303 may be welded or otherwise secured to proximal end 301 of pipe 300. Fixed attachment assembly 201 is then secured to the underside of traveling bridge assembly 23 using bolts through bolt holes 304 in flange 303.

In the preferred embodiment, fixed attachment assembly 201 is in fluid communication with suction header 75 and drops down from traveling bridge 23 and terminates in an open distal end 301. Fixed attachment assembly 201 functions to rotatably mount rotating backwash arm assembly 200 and to accommodate the flow of backwash fluid to the suction header 75, as hereinafter described. Distal end 301 may be machined or otherwise adapted in order to accommodate the rotational and other components of backwash arm assembly 200. An optional valve plate 305 having a flow orifice 306 may also be provided at the open portion of distal end 301 and secured thereto (FIG. 46). Valve plate 305 is intended to be included on the fixed assembly 201 that rotatably secures the rotating backwash arm assembly 200 on the outside edges of the system as hereinafter described. Valve plate 305 is not necessary on the interior arms 200.

Figure 36:
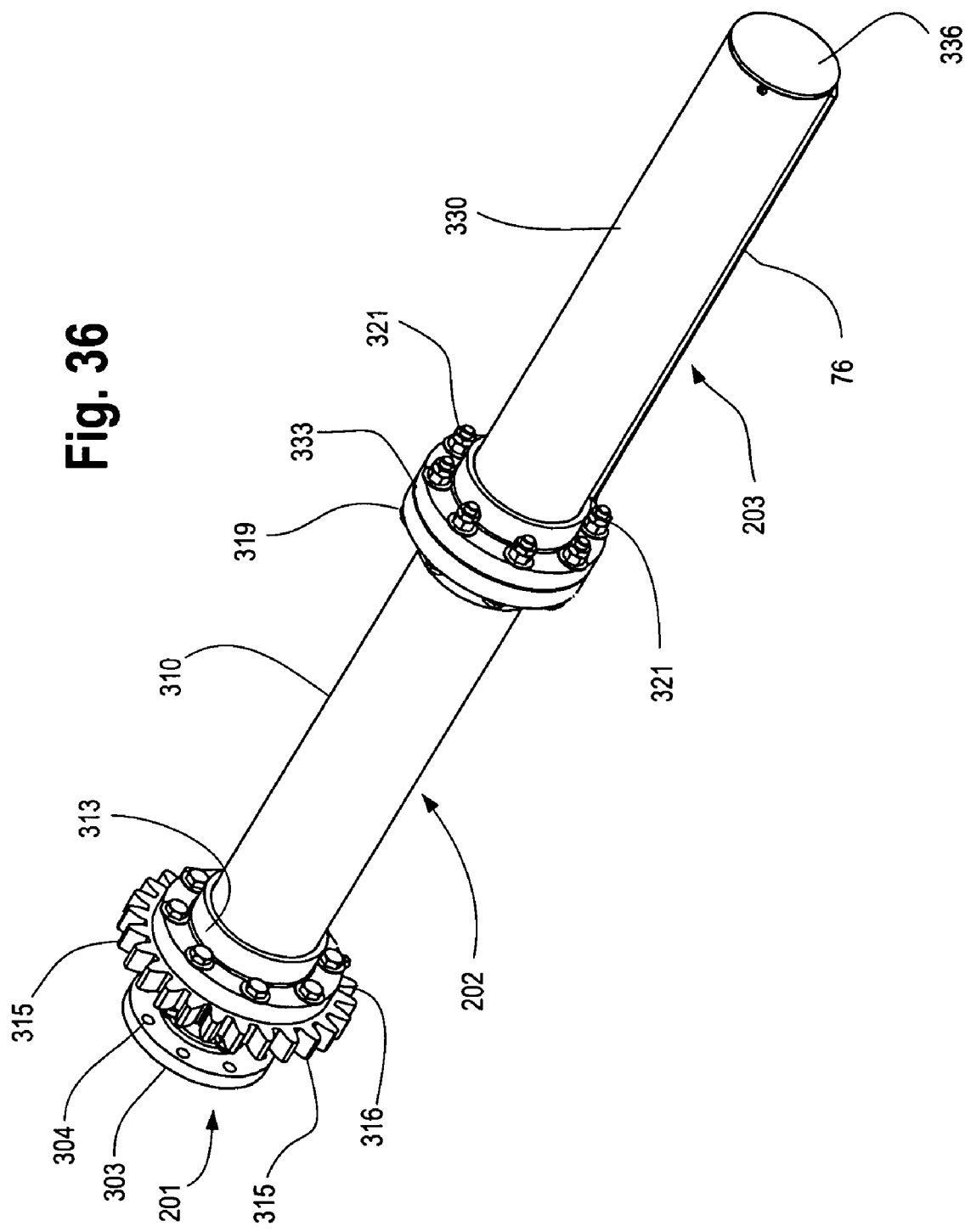
FIG. 36 is a perspective view of a preferred rotating arm assembly of the present invention.
Figure 37:
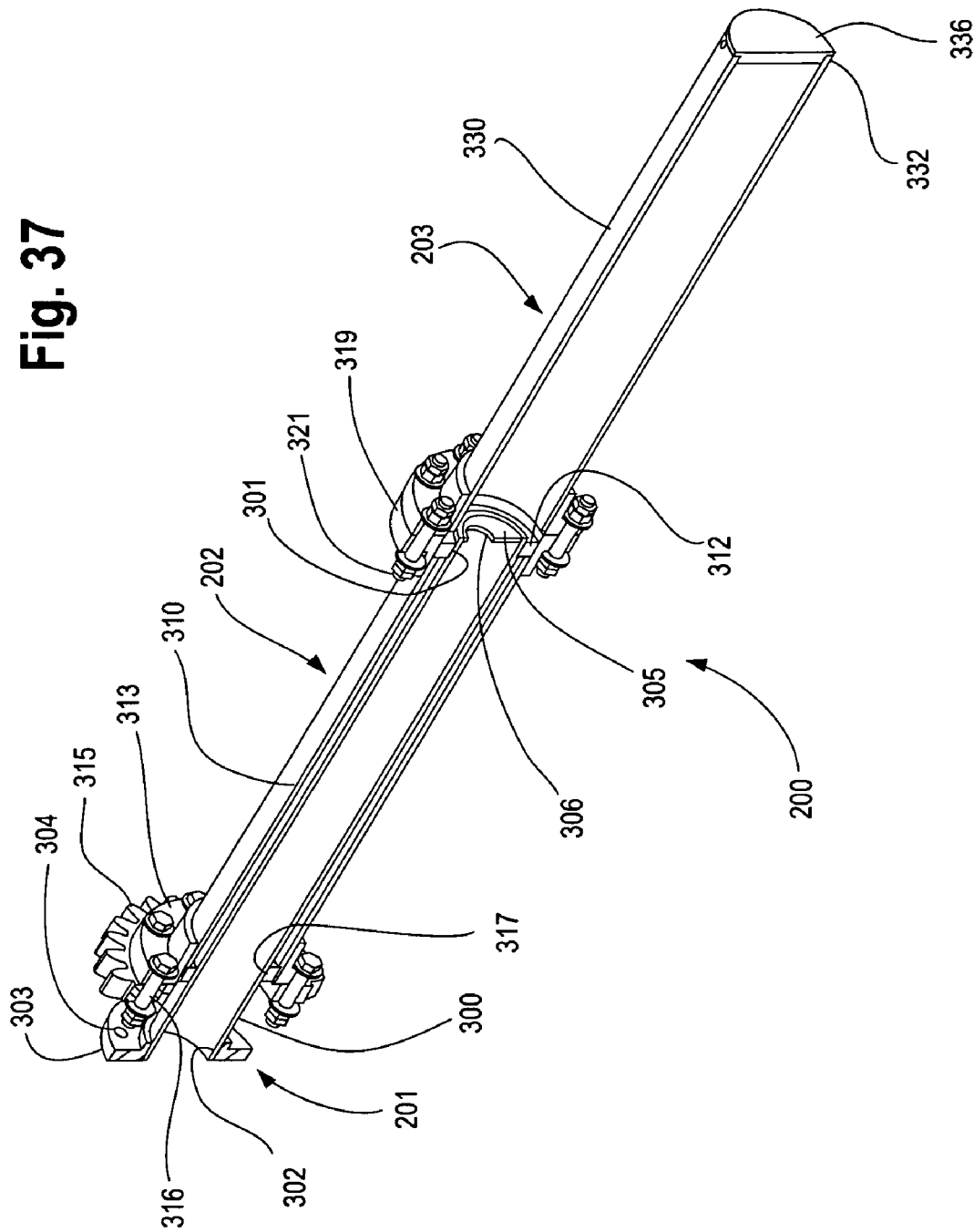
FIG. 37 is a perspective view of a preferred rotating arm assembly of FIG. 36, cut in half on its longitudinal axis to show the structure and orientation of the preferred components.
Figure 44:
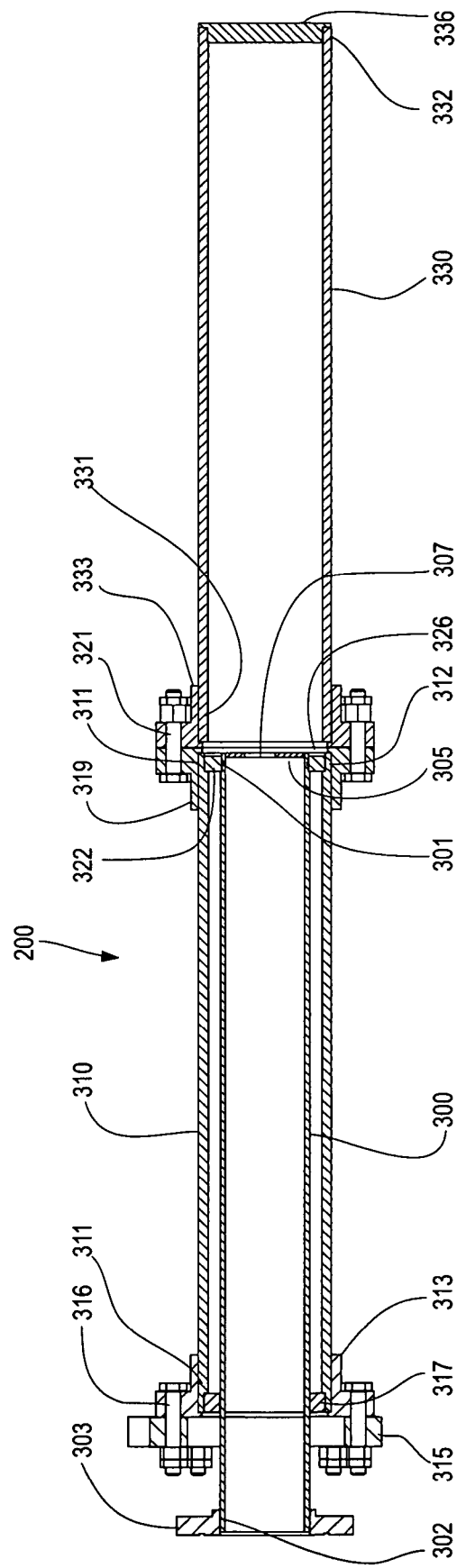
FIG. 44 is a cross sectional view of a preferred rotating backwash arm assembly, shown assembled, and including an optional valve plate and rotating valve plate.

A preferred embodiment of rotating backwash arm assembly 200 is shown in the drawings (see FIGS. 36, 37 and 44). As indicated, in the preferred embodiment, rotating backwash arm assembly 200 is composed of two major structural components, the sealed rotation assembly 202 and the shoe attachment assembly 203. It will be understood by those of skill in the art that, although not preferred, rotating arm assembly 200 may be one piece or several pieces consistent with the teachings of the present inventions. Similarly, fixed attachment assembly 201 may take a variety of configurations, or be omitted entirely, as long as rotating backwash arm 200 is in fluid communication with the suction header 75 of backwash assembly 21 and is permitted to rotate to effectuate cleaning of two adjacent rows of filter plates 26 as discussed herein.

Figure 40:
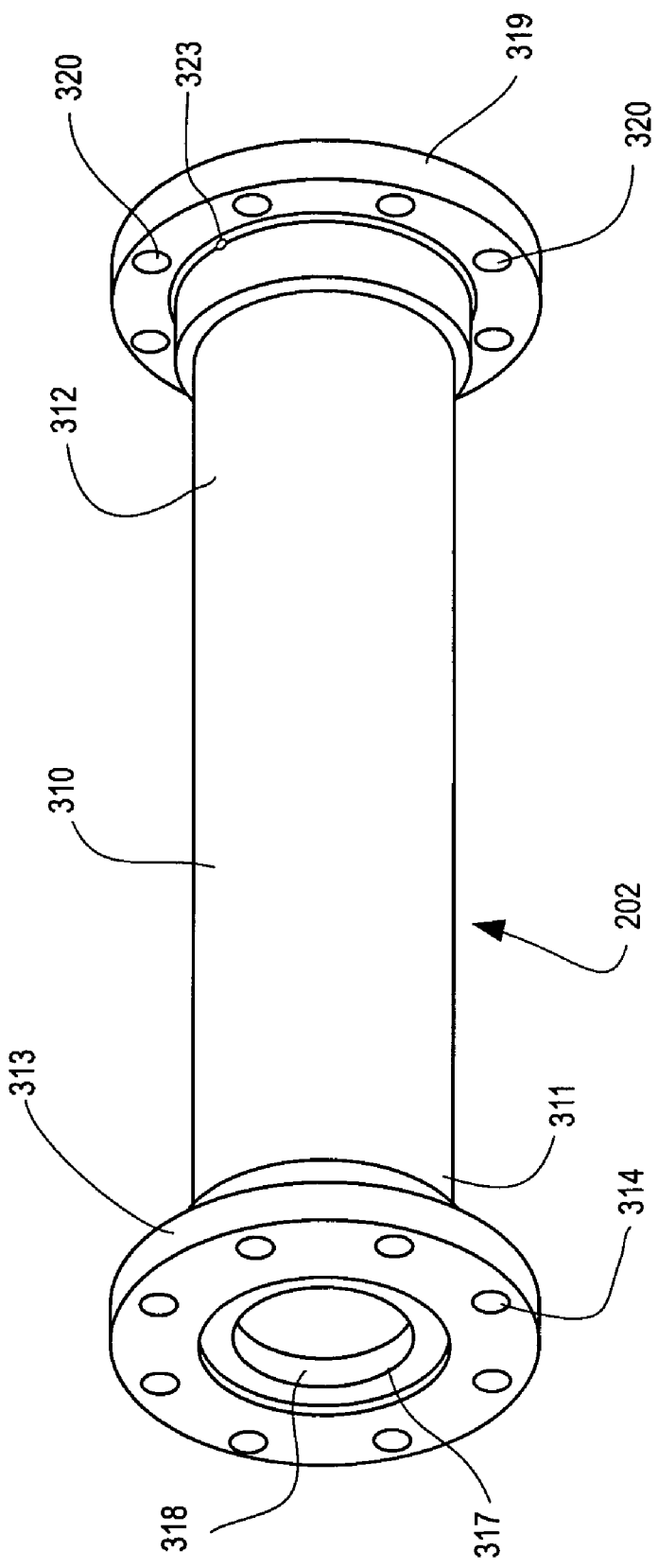
FIG. 40 is a perspective view of a preferred sealed pipe assembly of a preferred rotating backwash arm of the present invention.
Figure 41:
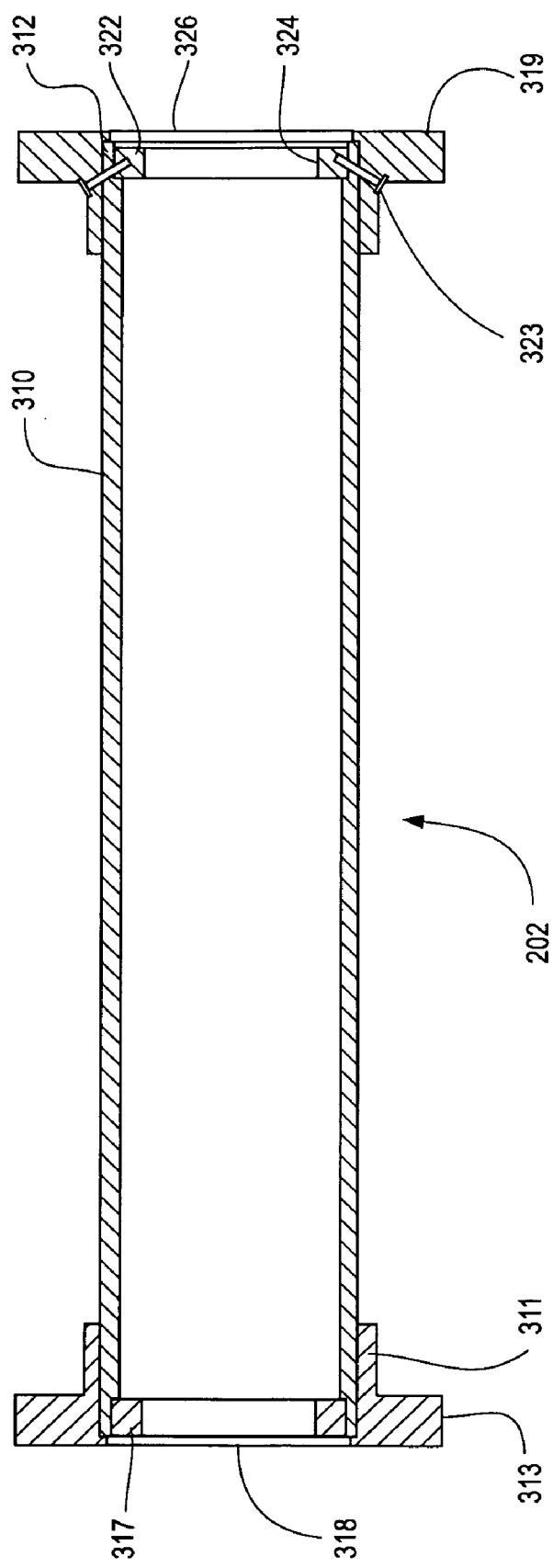
FIG. 41 is a side cross-sectional view of the preferred sealed pipe assembly of FIG. 40.

Details of the sealed rotation assembly 202 component of preferred arm assembly 200 are shown in FIGS. 40 and 41. A pipe 310 is provided which is sized to fit concentrically over fixed attachment assembly 201. Pipe 310 has a proximal end 311 and a distal end 312. Proximal end 311 is provided with a gear flange 313 having bolt holes 314 to secure a rotation gear 315 (see e.g., FIG. 36) using bolts 316 or cable, lines, screws or other well known means (not shown). In a preferred embodiment, an upper bearing 317, having an orifice 318 sized to engage the exterior of pipe 300 of fixed attachment assembly 201, is provided within the opening of proximal end 312.

The distal end 312 of pipe 310 is provided with a lower attachment flange 319 having holes 320 to accept bolts 321 to secure shoe attachment assembly 203. The interior of distal end 312 of pipe 310 is provided with a distal bearing 322 that is secured within the opening of distal end 311 using screws 323 or other well known fastening means. Distal bearing 322 includes an opening 324 that is sized to sealingly engage the exterior circumference of proximal end 301 of pipe 300 of fixed attachment assembly 201, yet at the same time, permit rotation of sealed pipe assembly 202 above fixed assembly 201. Distal bearing 322 may be further secured within the distal end 312 of pipe 310 with a spacer ring 326 that fits with a groove (not shown) on the interior circumference of distal end 312 of pipe 310.

As shown in FIGS. 36, 37 and 44, sealed rotation assembly 202 is placed over fixed attachment assembly 201. Upper bearing 317 is selected and sized so that it rotatably and sealingly secures, at least in part, sealed rotation assembly 202 to the proximal end 311 of pipe 310. Similarly, distal bearing 322 is selected and sized to sealingly and rotatably secure, at least in part, sealed pipe assembly 202 to distal end 312 of pipe 310. Together, upper bearing 317 and lower bearing 322 are sufficient to rotatably mount sealed rotation assembly 202 (as well as shoe attachment assembly 303 to fixed attachment assembly 201). Upper bearing 317 and lower bearing 322 act as spaced apart bushings that also hold rotating backwash arm assembly 200 in tight concentric alignment with fixed attachment assembly 201. It will be understood by those of skill in the art that the seal created by bearings 317 and 322 do not have to be completely water tight seals, but sufficient to provide adequate suction during the backwashing operation. However, it is preferred that the seal created by bearings 317 and 322 be airtight to prevent the entry of air and/or the cavitation of the pump (not shown). And, although the above means of securing rotating arm assembly 200 to fixed attachment assembly 201 is preferred, other means of rotating attachment are contemplated and will be understood by those of skill in the art.

Figure 42:
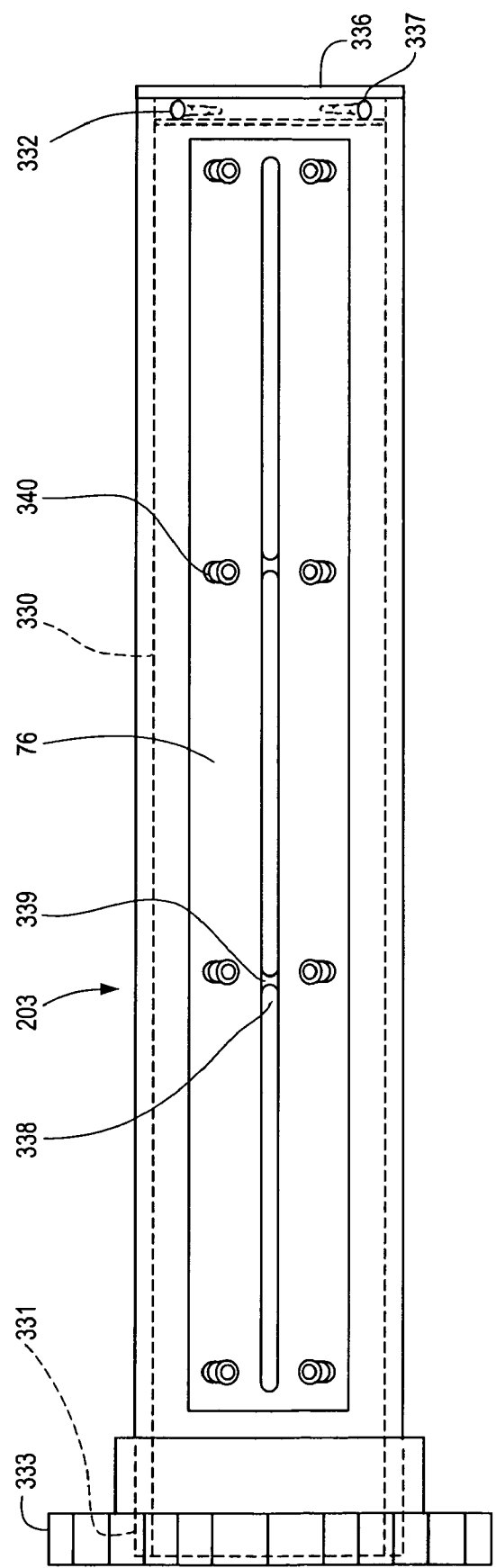
FIG. 42 is a plan view of a preferred embodiment of a shoe attachment assembly of the present invention.
Figure 43:
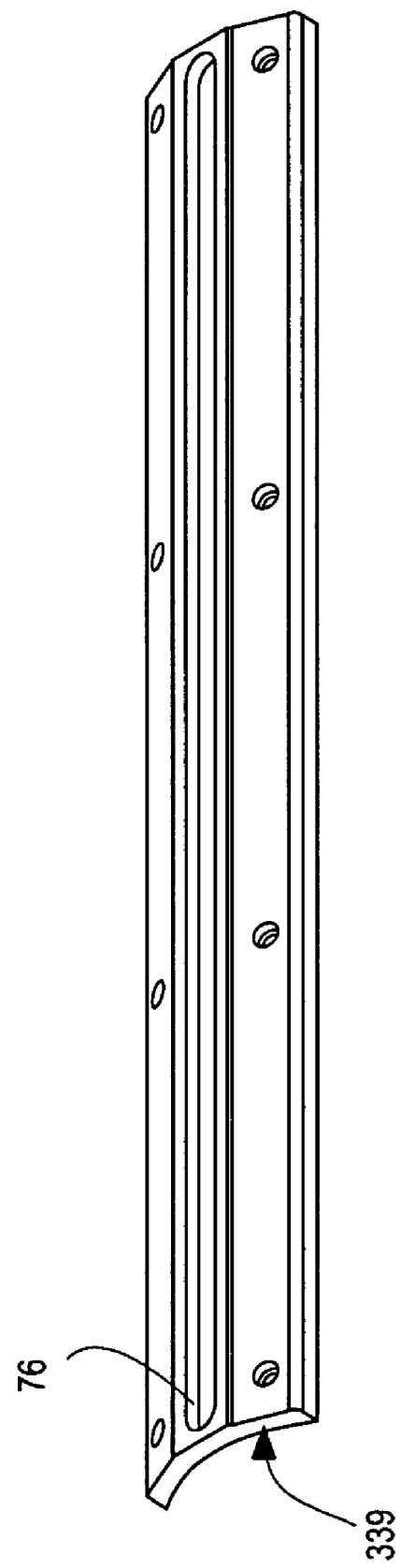
FIG. 43 is a perspective view of a preferred backwash shoe of the present invention.

Shoe attachment assembly 203 may best be seen by reference to FIGS. 42 and 43. In a preferred embodiment, attachment assembly 203 also includes a pipe 330 having a proximal end 331 and a distal end 332. Proximal end 331 is provided with a coupling flange 333 having holes 334 (not shown in FIG. 42) designed to mate with and be secured to distal flange 319 of sealed rotation assembly 202. In the case of an outside arm 200, a rotating value plate 307 having a flow orifice 309 (FIG. 47) is sandwiched between coupling flange 333 of shoe attachment assembly 203 and distal bearing 322 of sealed rotation assembly 202. Rotating valve plate 307 cooperates with valve plate 305 to prevent flow to an outside arm, as hereinafter described. The open distal end 332 of pipe 330 is sealed with an end cap 336 (FIG. 48), which may be secured with fasteners 337. A longitudinal slit 338 is provided through pipe 330, through which backwash water may flow. A backwash shoe 76, having a longitudinal slit 339 that coincides with slit 338 of pipe 330 is also provided. Backwash shoe 76 may then be attached to pipe 330 using screws 340 or other well known means and is designed to contact or otherwise clean cloth filter media 47.

Figure 45:
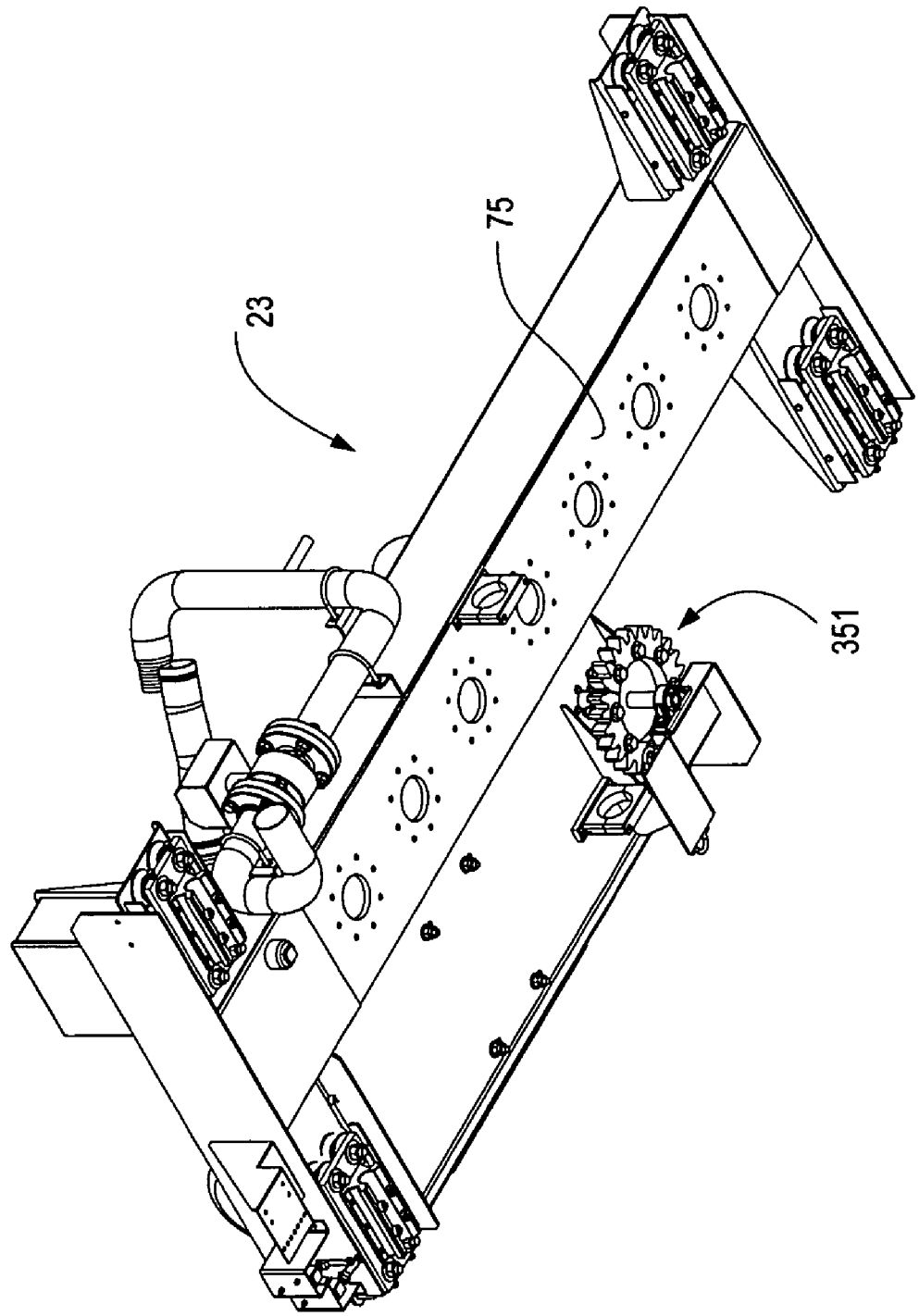
FIG. 45 is a perspective view of a typical traveling bridge assembly showing a preferred drive means for causing the selective rotation of the rotating backwash arm assemblies and which may function as a common suction manifold/header.

Rotation of arm assemblies 200 in the preferred embodiment may be seen by reference to FIGS. 32-35 and 45. As indicated, the proximal end 311 of each arm is provided with a rotation gear 315. When installed, the gears 315 of each of the arms are intermeshed so that they are able to rotate together (FIGS. 32 and 33). Rotation gears 315 of arms 200 are rotated using drive gear 351 (FIG. 45). Drive gear 351 mates with one or more rotation gears 315 and is driven by a motor 350 on traveling bridge assembly 23. Although preferred, arms 200 do not have to rotate together. For example, the may be individually controlled and/or individually rotated with their own motors 350 or other drive means that will be understood by those of ordinary skill in the art. In operation, once backwashing is accomplished in one direction of travel, the arms 200 are rotated 180° so that other cloth filter media surfaces are backwashed in the other direction of travel (see e.g., FIG. 35). Other rotational patterns or sequences may be used, consistent with the inventions and as will be understood by those of skill in the art.

In order to have efficient backwashing with relatively even suction, the exterior arms 200 should preferably be shut off during the direction of travel that they are not conducting the backwash operation. In a preferred embodiment, this is accomplished with the valve plate 305 and the rotating valve plate 307. Specifically, to conduct the backwash operation, flow orifice 306 of valve plate 305 is aligned with flow orifice 309 of rotating valve plate 307. When the arms are rotated to backwash in the other direction, orifice 306 is no longer aligned with flow orifice 309 and flow through that arm is shut off. It will be understood that the flow does not have to be completely blocked, so long as suction to the arm 200 is substantially reduced. Other means of stopping the flow to the exterior arms when they are not conducting the backwash operation are contemplated and will be understood by those of skill in the art.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" is sometimes used herein in the singular, it will be understood that there are a plurality of inventions as described and claimed.

Various features of the present inventions are set forth in the following claims.

What is claimed is:

1. A method for backwashing cloth filter media attached to a frame comprising the steps of:
    introducing untreated influent into a treatment basin and distributing said influent into a filtration region of said basin;
    filtering said influent through cloth filter media supported on at least two substantially linear, opposingly spaced filter plate frames, an interior of said at least two adjacent filter plate frames in fluid communication with at least one basin outlet;
    periodically cleaning said cloth filter media on said at least two adjacent filter plate frames by backwashing using a linearly moving backwash assembly including a source of suction and at least one substantially cylindrical rotating backwash arm communicating with a source of suction, said rotating backwash arm adapted to backwash opposing filter plate frame cloth filter media surfaces consecutively; and
    selectively rotating said backwash arm assembly to enable the backwashing of an adjacent cloth filter media surface consecutively, as desired.

2. The method of claim 1 wherein a plurality of rotating backwash arms are provided.

3. A method for filtering an influent flow of water or wastewater using stationary cloth media in a filtration basin comprising the steps of:
    introducing an influent flow into an influent channel;
    distributing the influent flow across the bottom of the filtration basin using at least one influent plenum having metering slots;
    filtering said influent through said cloth filter media which is supported on at least two adjacent substantially linear, opposingly spaced filter plates in a filtration reservoir of the filtration basin, an interior of said at least two adjacent filter plates in fluid communication with at least one effluent plenum which is sealed from unfiltered influent and through which the filtered effluent is discharged; and
    periodically cleaning said cloth filter media on said at least two adjacent filter plates using a linearly moving backwash assembly including a source of suction and at least one substantially cylindrical rotating backwash arm communicating with said source of suction, each rotating backwash arm adapted to backwash opposing filter plate surfaces consecutively.

4. The method of claim 3 including a control system for the selective operation of the backwash assembly and rotation of said backwash arms.

\* \* \* \* \*